(12) United States Patent
Matsuo

(10) Patent No.: US 8,332,463 B2
(45) Date of Patent: Dec. 11, 2012

(54) DISTRIBUTED STORAGE SYSTEM, CONNECTION INFORMATION NOTIFYING METHOD, AND RECORDING MEDIUM IN WHICH DISTRIBUTED STORAGE PROGRAM IS RECORDED

(75) Inventor: Hideki Matsuo, Minami-ku (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 219 days.

(21) Appl. No.: 12/730,634

(22) Filed: Mar. 24, 2010

(65) Prior Publication Data

US 2010/0306303 A1 Dec. 2, 2010

(30) Foreign Application Priority Data

May 27, 2009 (JP) ................. 2009-127593

(51) Int. Cl.
*G06F 15/16* (2006.01)
(52) U.S. Cl. ...................... 709/202; 709/201
(58) Field of Classification Search .................. 709/201, 709/202, 217, 230, 238
See application file for complete search history.

(56) References Cited

U.S. PATENT DOCUMENTS

2004/0044727 A1* 3/2004 Abdelaziz et al. ............ 709/203
2007/0283043 A1* 12/2007 Kiyohara et al. ............. 709/243
2008/0027898 A1 1/2008 Matsuo et al.
2008/0120359 A1 5/2008 Murakami
2008/0144636 A1 6/2008 Ushiyama et al.

FOREIGN PATENT DOCUMENTS

| JP | A-2006-197400 | 7/2006 |
| JP | A-2006-277338 | 10/2006 |
| JP | A-2007-53662 | 3/2007 |
| JP | A-2008-129694 | 6/2008 |

* cited by examiner

*Primary Examiner* — Joseph Avellino
*Assistant Examiner* — Marshall McLeod
(74) *Attorney, Agent, or Firm* — Oliff & Berridge, PLC

(57) ABSTRACT

A distributed storage system that includes: a plurality of node apparatuses connected to a plurality of different networks through a high order apparatus group or a low order apparatus group, the distributed storage system comprising: a first node apparatus that includes: a first storage unit which stores connection relationship information on the high order apparatus group and the low order apparatus group connected through the network; and a second node apparatus that includes: an acquisition unit which acquires first connection information, which indicates the high order apparatus group or the low order apparatus group that is a connection destination of the node apparatus, from the first node apparatus based on location information indicating locations of the plurality of node apparatuses; and a transmission unit which transmits the first connection information acquired by the acquisition unit to any of the plurality of node apparatuses included in the distributed storage system.

14 Claims, 20 Drawing Sheets

FIG. 4

| HIGH ORDER APPARATUS GROUP | LOW ORDER APPARATUS GROUP |
|---|---|
| HIGH ORDER APPARATUS GROUP 13a | LOW ORDER APPARATUS GROUP 14a |

FIG. 5

ROUTING TABLE USING DHT OF NODE N2 (NODE ID 122)

| | AREA OF 0XX NODE ID: 002 | AREA OF 1XX NODE ID: 122 | AREA OF 2XX NODE ID: 221 | AREA OF 3XX NODE ID: 301 |
|---|---|---|---|---|
| LEVEL 1 | IP ADDRESS AND PORT NUMBER OF NODE N3 | IP ADDRESS AND PORT NUMBER OF NODE N2 | IP ADDRESS AND PORT NUMBER OF NODE N21 | IP ADDRESS AND PORT NUMBER OF NODE N31 |
| | APPARATUS GROUP INFORMATION ON NODE N3 | APPARATUS GROUP INFORMATION ON NODE N2 | APPARATUS GROUP INFORMATION ON NODE N21 | APPARATUS GROUP INFORMATION ON NODE N31 |
| | AREA OF 10X NODE ID: 102 | AREA OF 11X NODE ID: 112 | AREA OF 12X NODE ID: 122 | AREA OF 13X NODE ID: 131 |
| LEVEL 2 | IP ADDRESS AND PORT NUMBER OF NODE N25 | IP ADDRESS AND PORT NUMBER OF NODE N28 | IP ADDRESS AND PORT NUMBER OF NODE N2 | IP ADDRESS AND PORT NUMBER OF NODE N35 |
| | APPARATUS GROUP INFORMATION ON NODE N25 | APPARATUS GROUP INFORMATION ON NODE N28 | APPARATUS GROUP INFORMATION ON NODE N2 | APPARATUS GROUP INFORMATION ON NODE N35 |
| | NODE ID: 120 | NODE ID: 121 | NODE ID: 122 | (NOT REGISTERED) |
| LEVEL 3 | IP ADDRESS AND PORT NUMBER OF NODE N22 | IP ADDRESS AND PORT NUMBER OF NODE N32 | IP ADDRESS AND PORT NUMBER OF NODE N2 | |
| | APPARATUS GROUP INFORMATION ON NODE N22 | APPARATUS GROUP INFORMATION ON NODE N32 | APPARATUS GROUP INFORMATION ON NODE N2 | |

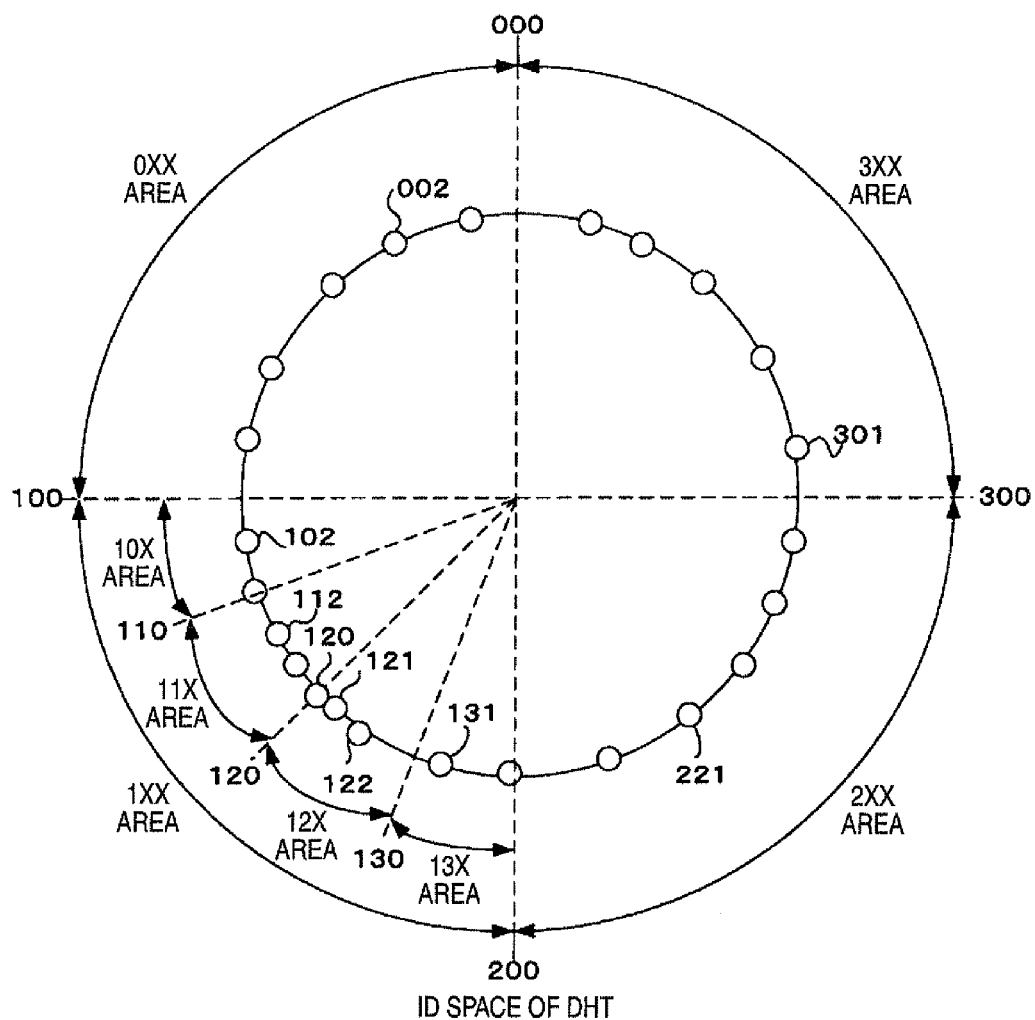

FIG. 9

INDEX CACHE OF NODE N2 (NODE ID 122)

| | NODE ID: 213 | NODE ID: 322 | NODE ID: 221 | NODE ID: 003 | NODE ID: 101 |
|---|---|---|---|---|---|
| CONTENT 1, CONTENT ID: 124 | IP ADDRESS AND PORT NUMBER OF NODE 22a / APPARATUS GROUP INFORMATION ON NODE 22a | IP ADDRESS AND PORT NUMBER OF NODE 22b / APPARATUS GROUP INFORMATION ON NODE 22b | IP ADDRESS AND PORT NUMBER OF NODE 22c / APPARATUS GROUP INFORMATION ON NODE 22c | IP ADDRESS AND PORT NUMBER OF NODE 22d / APPARATUS GROUP INFORMATION ON NODE 22d | IP ADDRESS AND PORT NUMBER OF NODE 22e / APPARATUS GROUP INFORMATION ON NODE 22e |
| CONTENT 2, CONTENT ID: 126 | NODE ID: 131 / IP ADDRESS AND PORT NUMBER OF NODE n35 / APPARATUS GROUP INFORMATION ON NODE 35 | (NOT REGISTERED) | (NOT REGISTERED) | (NOT REGISTERED) | (NOT REGISTERED) |
| CONTENT 3, CONTENT ID: 127 | NODE ID: 121 / IP ADDRESS AND PORT NUMBER OF NODE 32 / APPARATUS GROUP INFORMATION ON NODE 32 | NODE ID: 120 / IP ADDRESS AND PORT NUMBER OF NODE 22 / APPARATUS GROUP INFORMATION ON NODE 22 | (NOT REGISTERED) | (NOT REGISTERED) | (NOT REGISTERED) |
| ... | ... | ... | ... | ... | ... |

FIG. 10

| HOLD NODE | HIGH ORDER APPARATUS GROUP | LOW ORDER APPARATUS GROUP |
|---|---|---|
| NODE APPARATUS 22a | 13a | 14a |
| NODE APPARATUS 22b | 13a | 14b |
| NODE APPARATUS 22c | 13a | Null |
| NODE APPARATUS 22d | 13b | Null |
| NODE APPARATUS 22e | 13b | 14c |

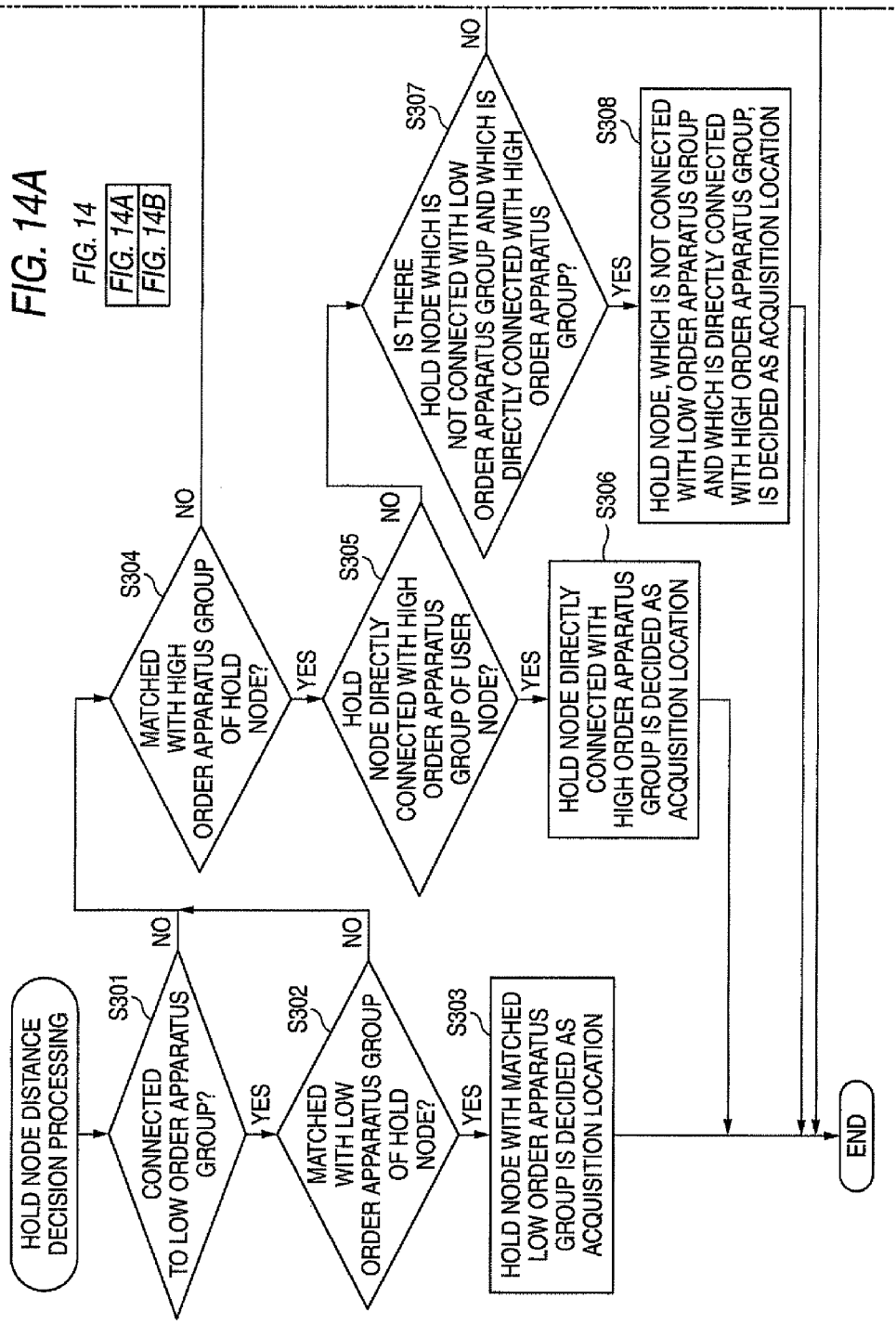

| FIG. 17A |
| FIG. 17B |

DISTRIBUTED STORAGE SYSTEM, CONNECTION INFORMATION NOTIFYING METHOD, AND RECORDING MEDIUM IN WHICH DISTRIBUTED STORAGE PROGRAM IS RECORDED

CROSS REFERENCE TO RELATED APPLICATION

The present application claims priority from Japanese Patent Application No. 2009-127593, which was filed on May 27, 2009, the disclosure of which is herein incorporated by reference in its entirety.

TECHNICAL FIELD

The apparatuses, devices and methods consistent with the present invention relate to a peer-to-peer (P2P) type communication system including a plurality of node apparatuses which can communicate with each other through a network. Specifically, the invention relates to a method of acquiring the content from a content holder located in a communication path with a small communication load.

BACKGROUND

A related art peer-to-peer type communication system is configured to include a plurality of node apparatuses. The content data of various content are distributed and stored in a plurality of node apparatuses as replicated data (hereinafter, referred to as "replica") of a plurality of content data. The content data is content data of film, music, and the like. Generally, one of the related art peer-to-peer type communication system is a distributed storage system which allows replicas to be used between node apparatuses. According to the related art, failure resistance and distribution efficiency of access are improved. The locations of replicas which are distributed and stored as described above are efficiently searched using a distributed hash table.

In addition, when acquiring the desired content, the node apparatus transmits to other node apparatuses a message for searching for the location of a replica of corresponding content data. According to this, the message is transmitted to a node apparatus, which manages the location of the replica of the corresponding content data, according to the DHT. Then, the node apparatus which transmitted the message acquires the information indicating the location of the replica from the node apparatus which manages the location. Accordingly, the node apparatus which transmitted the message can access a node apparatus which stores the replica of the content data corresponding to the search. Then, the node apparatus which transmitted the message can acquire (download) the replica.

SUMMARY

In order to select a communication path with a small communication load, an AS (Autonomous System) number to which the content holder belongs may be used. The AS number is a number for identifying a network operated by a plurality of organizations in the Internet. In addition, a path may be selected using the number of hops. However, even if measuring the number of hops is tried, a router does not necessarily reply. In addition, even if deciding a communication path is tried by using the AS number, the AS number is not necessarily assigned to all administrators. Therefore, in the related art, a hint server (tracker) in which the topology information of the Internet is stored has been used in order to determine the communication load between all node apparatuses. In this case, however, since it is necessary to access the hint server whenever the content is acquired, the processing load concentrates on the hint server. Accordingly, the processing load of the hint server was large.

The invention has been made to solve the above problems. It is an object of the invention to provide a communication path method capable of reducing the processing load of a hint server by preventing the processing load from concentrating on the hint server.

According to an illustrative aspect of the present invention, there is provided a distributed storage system that includes: a plurality of node apparatuses connected to a plurality of different networks through a high order apparatus group or a low order apparatus group, the high order apparatus group including at least one communication apparatus which connects between the networks, the low order apparatus group including at least one communication apparatus which is located below the high order apparatus group in the order level and is connectable to the plurality of different networks through the high order apparatus group, and the distributed storage system storing a plurality of contents so as to be distributed in the plurality of node apparatuses, the distributed storage system comprising: a first node apparatus that includes: a first storage unit which stores connection relationship information on the high order apparatus group and the low order apparatus group connected through the network; and a second node apparatus that includes: an acquisition unit which acquires first connection information, which indicates the high order apparatus group or the low order apparatus group that is a connection destination of the node apparatus, from the first node apparatus based on location information indicating locations of the plurality of node apparatuses and the connection relationship information stored in the first storage unit; and a transmission unit which transmits the first connection information acquired by the acquisition unit to any of the plurality of node apparatuses included in the distributed storage system.

According to the aspect of the invention, the transmission section transmits the first connection information acquired by the acquisition section to any of the plurality of node apparatuses included in the distributed storage system. In this case, since each node apparatus transmits the connection information on each node apparatus itself to other node apparatuses, the connection information is distributed and stored in the plurality of node apparatuses. Accordingly, it is not necessary to access a hint server whenever each node apparatus acquires the content. As a result, since the processing load does not concentrate on the hint server, the processing load of the hint server can be reduced.

BRIEF DESCRIPTION OF THE DRAWINGS

Illustrative aspects of the invention will be described in detail with reference to the following figures wherein:

FIG. 4 is a conceptual view showing an example of the apparatus group information stored in a node apparatus 21*a* shown in FIG. 3;

FIG. 5 is a conceptual view showing an example of a routing table held in a node N2;

FIG. 6 is a conceptual view showing an example of the ID space of a DHT;

FIG. 9 is a view showing an example of an index cache held in the node N2;

FIG. 10 is a conceptual view showing the details of the apparatus group information in index caches of hold nodes 22a to 22e stored in a root node;

FIG. 14A and FIG. 14B are flow charts when hold node distance decision processing of the node apparatus Nn is executed according to a hold node distance decision processing program;

DETAILED DESCRIPTION OF EXEMPLARY EMBODIMENTS OF THE PRESENT INVENTION

Hereinafter, preferred embodiments of the invention will be described with reference to the accompanying drawings.

<Configuration of a Distributed Storage System>

Figure 1:
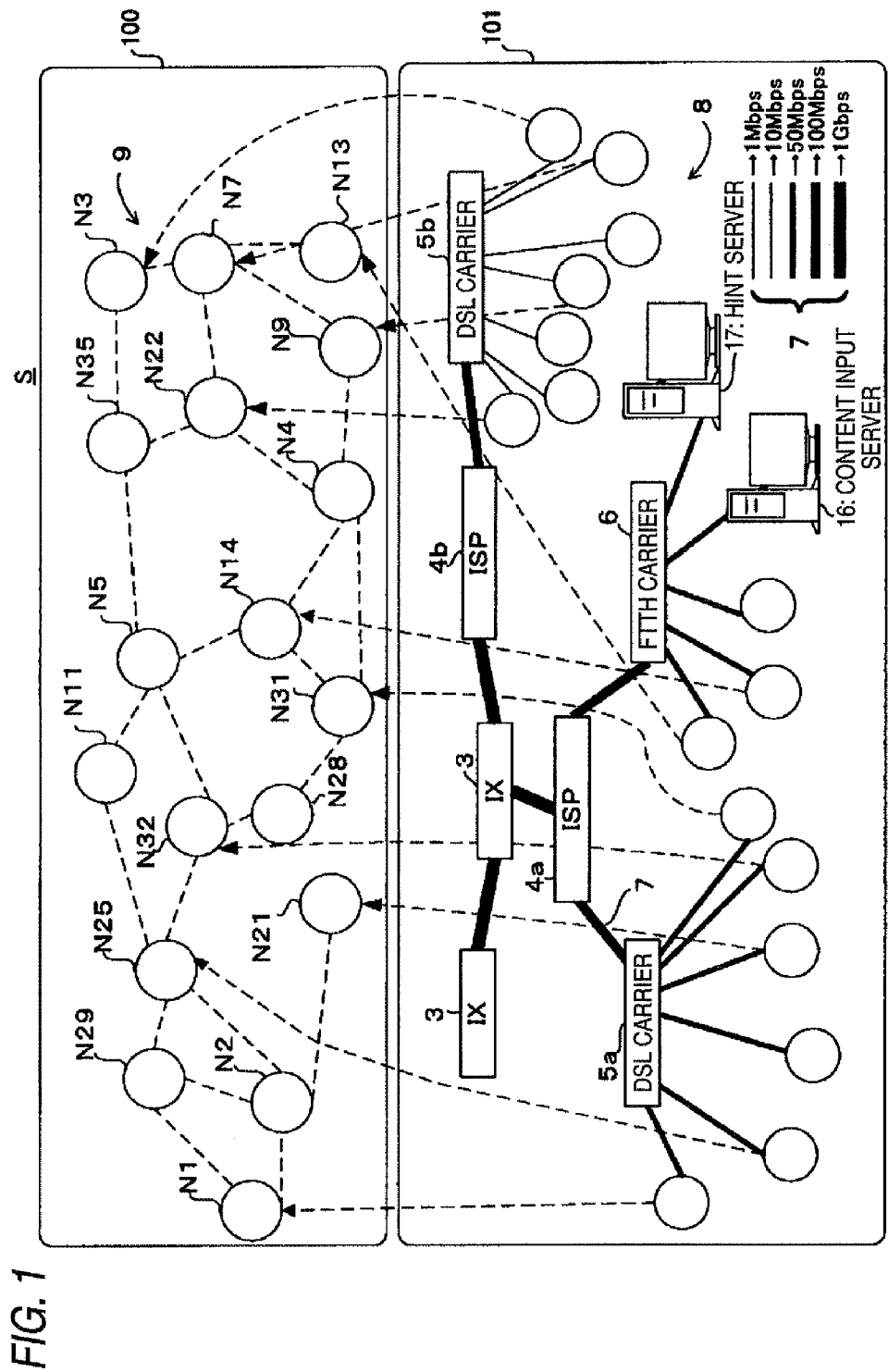
FIG. 1 is a view showing an example of a connection state of each node apparatus Nn in a content distributed storage system according to the present embodiment.

First, the outline of the configuration and operation of a distributed storage system S according to the present embodiment will be described with reference to FIG. 1 and the like. FIG. 1 shows a specific configuration view 101 of a distributed storage system and a conceptual configuration view 100. As shown in the specific configuration view 101, the distributed storage system S includes a plurality of node apparatuses Nn (n=1, 2, 3, . . . ). As shown in the lower frame 101 of FIG. 1, a general network 8, such as the Internet, is built by an IX (Internet eXchange) 3, ISPs (Internet Service Provider) 4a and 4b, apparatuses 5a and 5b of DSL (Digital Subscriber Line) carriers, an apparatus 6 of an FTTH (Fiber To The Home) carrier, a communication line 7, and the like. For example, the communication line 7 is a telephone line, an optical cable, and the like. In addition, a router (not shown) for transmitting the data (packet) is appropriately inserted in the network 8 in the example of FIG. 1.

The network 8 includes a plurality of node apparatuses Nn (n=1, 2, 3, . . . ). The plurality of node apparatuses Nn are connected to the Internet through a router or the like. In addition, a unique serial number and an IP (Internet Protocol) address are assigned to each node apparatus Nn. The distributed storage system S according to the present embodiment is a network system based on a peer-to-peer method. As shown in the conceptual configuration view 100 of FIG. 1, the network system based on the peer-to-peer method is realized by participation of some of the node apparatuses Nn. The participation in the present embodiment means that the node apparatus Nn is connected with the distributed storage system S in order to transmit and receive the content data.

In addition, a P2P network 9 shown in the conceptual configuration view 100 of FIG. 1 is a P2P network formed using the existing network 8. The P2P network is built by virtually linking a plurality of node apparatuses in the conceptual configuration view 100 of FIG. 1 to each other. The P2P network 9 is an overlay network or a logic network. The P2P network 9 is built by a specific algorithm. For example, the P2P network 9 is built by the algorithm using a DHT disclosed in JP-A-2006-197400.

In addition, a node ID is assigned to each node apparatus Nn included in the P2P network 9. The Node ID is unique identification information of predetermined digits. In addition, specifically, the node ID is created on the basis of an IP address or serial number individually assigned to each node apparatus Nn. The node ID is a hash value of the IP address or serial number obtained by using a common hash function. For example, the hash value with a bit length of 160 bits is created by a hash function, such as SHA-1. Node IDs are disposed in a certain ID space so as to be distributed without being biased.

As shown in FIG. 1, the distributed storage system S includes a content input server 16 and a hint server 17. The content input server 16 is a server for inputting the new content data in the distributed storage system S. The content input server 16 inputs a replica, which is obtained by replicating the content data, to the distributed storage system S.

The hint server 17 stores the topology information on a high order apparatus group and a low order apparatus group which are connected to the Internet. Details of the topology information stored in the hint server will be described later. In addition, instead of building the hint server 17, a contact node to be described later may be built to have a function of the hint server 17.

For participation in the distributed storage system S, the node apparatus Nn which does not participate in the P2P network 9 currently transmits a participation message indicating a participation request to the arbitrary node apparatuses Nn which participates in the P2P network 9 currently. The node apparatus which receives the participation message is a node apparatus which always participates in the distributed storage system S. In the present embodiment, the node apparatus which always participates is called a contact node. For example, a participation message is transmitted from a node apparatus, which does not participate in the P2P network 9, to a contact node of the distributed storage system S. The contact node transmits the information, which is required to participate in the P2P network 9, to the node apparatus which has transmitted the participation message. Details of the required information will be described later.

Figure 2:
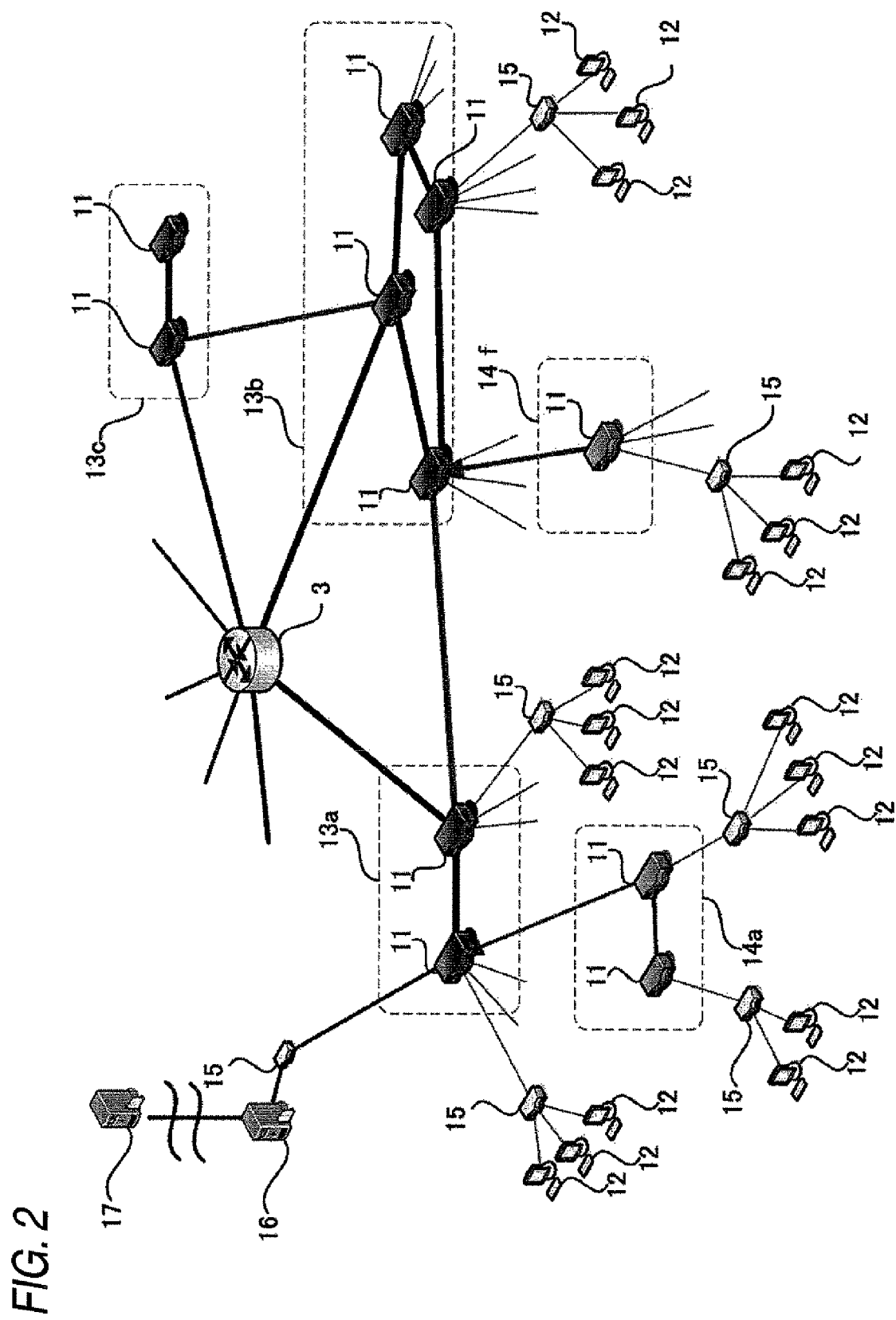
FIG. 2 is an explanatory view showing a specific example of the network structure of the general Internet.

As shown in FIG. 2, the IX (Internet eXchange) 3 is connected with a plurality of apparatus groups through a network. High order apparatus groups 13a to 13c are connected to each other through the IX with the IX 3 as the top. Low order apparatus groups 14a and 14f are connected to the high order apparatus group 13a to 13c with the IX 3 as the top. The high order apparatus groups 13a to 13c and the low order apparatus groups 14a and 14f are formed by a plurality of routers 11. The router 11 which forms each apparatus group is managed by an arbitrary administrator. An IP address in a predetermined range is assigned to each router 11. IP addresses corresponding to a plurality of routers which form the high order apparatus groups 13a to 13c are set as an IP address range of the high order apparatus groups 13a to 13c. Similarly, IP addresses of a plurality of routers which form the low order apparatus groups 14a and 14f are set as an IP address range of the low order apparatus groups 14a and 14f.

As shown in FIG. 2, many node apparatuses 12 are connected to the high order apparatus groups 13a to 13c or the low order apparatus groups 14a and 14f through the routers 11 with the IX 3 as the top. The node apparatus 12 is connected with the router 11 through a subscriber modem 15. In addition, the router 11 and the node apparatus 12 may be directly connected with each other.

[Explanation on Topology Information]

Figure 3:
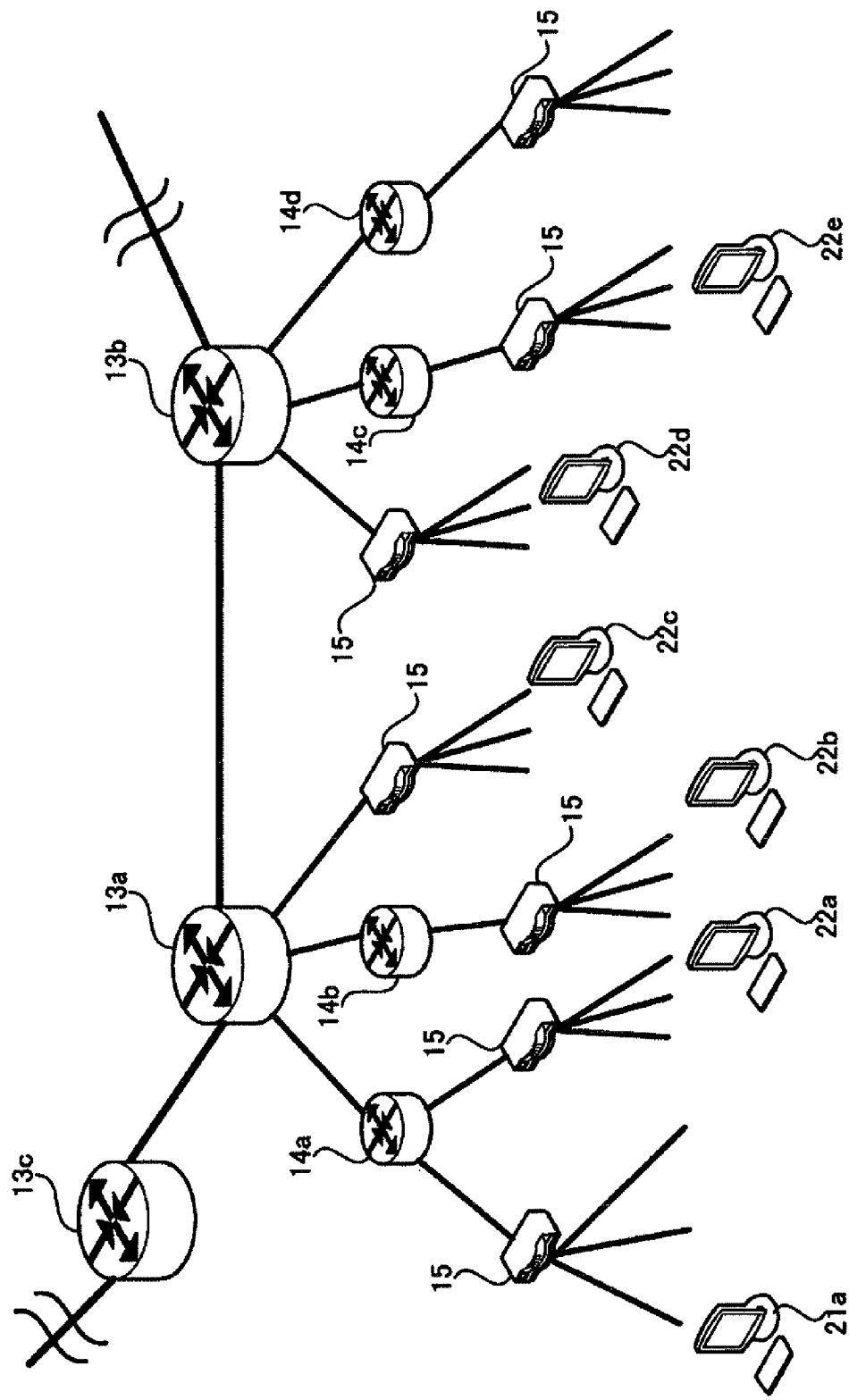
FIG. 3 is a conceptual view showing the topology information stored in a hint server 17.

As shown in FIG. 3, the topology information indicates a connection state of the high order apparatus group and the low order apparatus group. Specifically, the topology information includes the connection relationship information and the IP address range information. The connection relationship information is the information indicating the connection relationship of a plurality of high order apparatus groups or low order apparatus groups which form the Internet. In addition, the IP address range information is an IP address range corresponding to each of the high order apparatus group and the low order apparatus group. For example, the connection relationship information is the information indicating that the high order apparatus groups connected to the high order apparatus group 13a in FIG. 3 are the high order apparatus groups 13b and 13c. In addition, the connection relationship information is the information indicating that the low order apparatus groups connected to the high order apparatus group 13a are the low order apparatus groups 14a and 14b. When a user node acquires content, the content can be acquired from a hold node apparatus, for which a minimum number of apparatus groups are passed through from the user node, on the basis of the topology information and an IP address of the user node. Moreover, in the present embodiment, the user node indicates the node apparatus Nn which creates a content location query message according to an instruction from the user. In addition, the hold node indicates the node apparatus Nn in which the content data is stored.

In the present embodiment, in addition to the participation processing for participating in the P2P network 9, the apparatus group information on a node apparatus is decided. Specifically, the apparatus group information on a node apparatus which transmitted a participation message is decided on the basis of an IP address included in the participation message transmitted from the node apparatus. The decision method will now be described in detail. Specifically, the IP address range information described above is an address range "10. 10. 10. 10~10. 10. 10. 90". This address range indicates addresses assigned to routers included in the high order apparatus group or the low order apparatus group. Hereinafter, the case where a contact node has a function of the hint server 17 will be described. When a certain node apparatus participates in the P2P network 9, the participating node apparatus transmits a participation message to a contact node. The contact node is an apparatus that the node apparatus participating in the P2P network 9 accesses first. Details of the contact node will be described later. The participating node apparatus transmits the participation message to the contact node. The participation message includes an IP address of the node apparatus which transmits the participation message. For example, when an IP address of a node 21a is "10. 10. 10. 89", the IP address "10. 10. 10. 89" is included in the participation message. Then, the IP address information including the IP address "10. 10. 10. 89", which is included in the participation message, as an address range is changed by the contact node. For example, since the IP address "10. 10. 10. 89" is included in the above address range "10. 10. 10. 10~10. 10. 10. 90", a high order apparatus group or a low order apparatus group corresponding to the address range "10. 10. 10. 10~10. 10. 10. 90" is decided. The decided high order apparatus group or low order apparatus group is acquired by the participating node apparatus. By executing this processing, the participating node apparatus can acquire the high order apparatus group or the low order apparatus group connected to the participating node apparatus. By executing the same processing as described above for the hold node, the hold node can acquire the high order apparatus group or the low order apparatus group connected to the hold node. Details of the hold node will be described later.

When the hint server 17 is established unlike the contact node, a node apparatus participating in the P2P network 9 or a hold node accesses the hint server 17. In addition, by executing the above-described processing, the participating node apparatus or the hold node can acquire a high order apparatus group or a low order apparatus group connected to the nodes.

<Explanation on a Content Acquisition Operation of a Distributed Storage System>

Each node Nn shown in FIG. 1 or 2 holds a routing table using a DHT. The routing table specifies the transmission destinations of various messages on the distributed storage system S. Specifically, a plurality of items of node information including node IDs, IP addresses, and port numbers of the node apparatuses Nn which are appropriately separated from each other in the ID space are registered in the routing table. In the present embodiment, the node information includes a "node ID", "IP address and port number", and "apparatus group information" of a message transmission destination candidate.

The "apparatus group information" indicates a low order apparatus group to which the node apparatus Nn itself is directly connected or a high order apparatus group of the low order apparatus group which is directly connected with the node apparatus Nn. As shown in FIG. 3, the low order apparatus group which is directly connected with the node apparatus 21a is the low order apparatus group 14a. In addition, the node apparatus 21a is connected with the high order apparatus group 13a through the low order apparatus group 14a. Therefore, as shown in FIG. 4, the low order apparatus group 14a and the high order apparatus group 13a are registered as the apparatus group information on the node apparatus 21a. Each node apparatus stores the information on an apparatus group connected with each node apparatus. In addition, a detailed explanation on how each node apparatus Nn acquires the apparatus group information will be performed later.

One node connected to the distributed storage system S stores the node information on the necessary minimum node Nn as a routing table. Since various messages are transmitted between the nodes Nn, the node information on the node Nn which does not store the node information is acquired. In the present embodiment, when transmitting various messages to other node apparatuses Nn described above using a routing table, the messages are transmitted in a state where the node information on the node apparatus Nn which transmits the message is included. Each node apparatus Nn which received the message registers and updates the received node information in a routing table and an index cache that each node apparatus Nn holds. By such a configuration, each node apparatus Nn can check the node information on other node apparatuses. Details of a method of registering and updating the routing table and the index cache will be described later.

[Outline of a Routing Table]

Hereinafter, a function of each node apparatus Nn in the distributed storage system S will be described. A routing table stored in each node apparatus Nn will be described in detail. Here, the routing table will be described in detail with reference to FIGS. 5 and 6.

Moreover, in the example shown in FIGS. 5 and 6, the bit length of a node ID is set to 6 bits (2 bits×3 digits) for convenience of explanation. Therefore, each digit is expressed as a quaternary number (integer of 0 to 3) of 2 bits. The bit length longer than 2 bits may be adopted for each digit. For example, it may be expressed as a hexadecimal number of 0 to f by expressing each digit in 4 bits.

As shown in FIG. 5, a routing table has a plurality of levels of level 1 (first stage) to level 3 (third stage). The node information is registered in each area. As the node information, a node ID, an IP address and a port number of a node N2 corresponding to the node ID, and apparatus group information on the node N2 are registered so as to match each other.

Each area in each level is an area decided by dividing a node ID space. The node ID space is configured to have three digits each of which is expressed as a quaternary number (integer of 0 to 3). As shown in FIG. 6, as an area of level 1, the node ID space is divided into four areas (since it is a quaternary number). Specifically, the area of level 1 is divided into the area of 0XX, the area of 1XX, the area of 2XX, and the area of 3XX. The area of 0XX is an area where node IDs of '000' to '033' are present. The area of 1XX is an area where node IDs of '100' to '133' are present. The area of 2XX is an area where node IDs of '200' to '233' are present. The area of 3XX is an area where node IDs of '300' to '333' are present.

Moreover, in the level 2, the area of level 1 is further divided into four areas (since it is a quaternary number). That is, each area of 0XX to 3XX is further divided into four areas. Each of the area of 0XX, the area of 1XX, the area of 2XX, and the area of 3XX is divided into four areas. For example, in the case of the area of 1XX, the area where node IDs of '100' to '103' are present is divided as an area of 10X. In addition, the area where node IDs of '110' to '113' are present is divided as an area of 11X. The area where node IDs of '120' to '123' are present is divided as an area of 12X. The area where node IDs of '130' to '133' are present is divided as an area of 13X.

Now, the case where the node ID of the node N2 is '122' will be described as an example. As shown in FIG. 5, the area of 1XX in the level 1 of the routing table is an area where the node ID of the node N2 is present. Therefore, the node ID, the IP address or the port number, and the apparatus group information of the node N2 itself are registered in the area of 1XX of level 1. Although the node ID, the IP address or the port number, and the apparatus group information of the node N2 itself are registered in the present embodiment, the node ID, the IP address or the port number, and the apparatus group information may not be registered because they belong to the node N2 itself. A node ID, an IP address or a port number, and apparatus group information of another arbitrary node Nn are registered in the area where the node ID of the node N2 is not present. When the node ID of the node N2 is "122", the area where the node ID of the node N2 is not present is the area of 0XX, the area of 2XX, and the area of 3XX.

In addition, the area of 12X in the level 2 of the routing table is an area where the node ID of the node N2 is present. Therefore, the node ID, the IP address or the port number, and the apparatus group information of the node N2 itself are registered in the area of 12X of level 2. Similar to the level 1, a node ID, an IP address or a port number, and apparatus group information of another arbitrary node Nn are registered in the area where the node ID of the node N2 is not present. Although the node ID, the IP address or the port number, and the apparatus group information of the node N2 itself are registered in the present embodiment, the node ID, the IP address or the port number, and the apparatus group information may not be registered because they belong to the node N2 itself.

Moreover, as shown in FIG. 5, node IDs are "120" to "122" in the level 3 of the routing table. Therefore, the node ID, the IP address or the port number, and the apparatus group information of the node N2 itself are registered in the area of 122 of level 3. Although the node ID, the IP address or the port number, and the apparatus group information of the node N2 itself are registered in the present embodiment, the IP address or the port number and the apparatus group information may not be registered because they belong to the node N2 itself.

Moreover, in the example shown in FIGS. 5 and 6, the bit length of a node ID is set to 3 digits×2 bits. For example, if the bit length of a node ID is set to 16 digits×4 bits, a table of 16 levels is needed. As shown in FIGS. 5 and 6, in the routing table in the present embodiment, the area becomes narrow as the numeric value of a level increases. Moreover, such a routing table is created when a non-participating node apparatus participates in the distributed storage system S. Here, the procedure of creating a routing table at the time of participation in the distributed storage system S will be described in detail with reference to FIG. 7.

Figure 7:
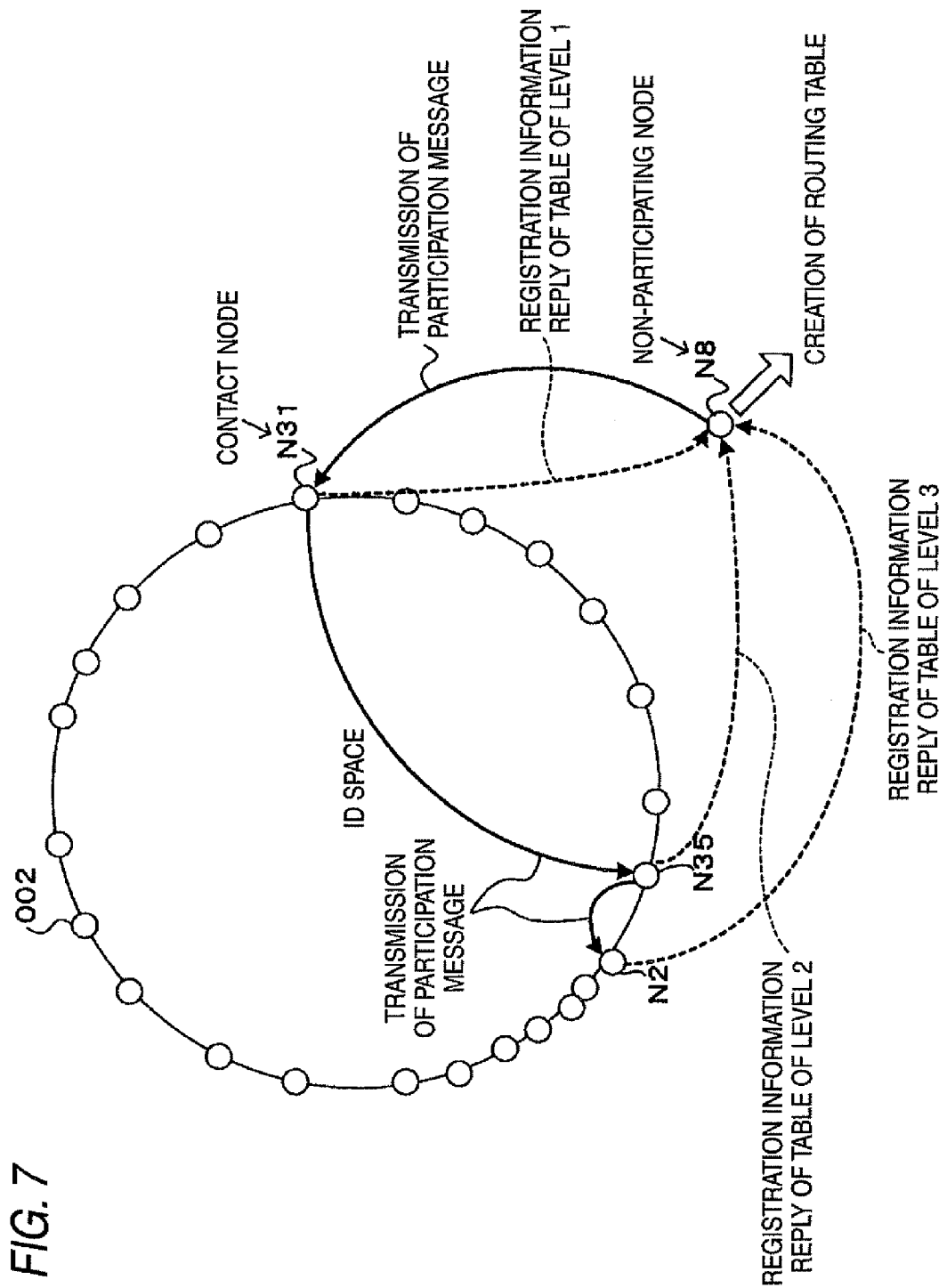
FIG. 7 is a conceptual view showing an example of the procedure of creating a routing table at the time of participation in a distributed storage system S.

FIG. 7 is a conceptual view showing an example of the procedure of creating a routing table at the time of participation in the distributed storage system S. Now, the explanation will be performed using an example where a non-participating node N8 participates in the content distributed storage system S. A node ID of the node N8 is set to "123".

As shown in FIG. 7, when the non-participating node N8 participates in the distributed storage system 5, a participation message is transmitted to a contact node using an IP address of the contact node. The participation message includes the node information on the node N8. It is assumed that the node apparatus N8 knows the IP address for transmitting a message to the contact node beforehand. For example, when downloading software required for participating in the P2P network, the IP address of the contact node is distributed. The contact node which received the participation message refers to a routing table of the contact node. Specifically, the contact node refers to the node information registered in the table of the level 1 in the routing table. The contact node replies to the node N8 with a reply message including the node information registered in the level 1. In addition, the contact node compares the node ID included in the received participation message with node IDs of other nodes Nn registered in the routing table. On the basis of a comparison result, one node Nn is selected from the routing table. For example, a node N35 which is a node ID closest to the node ID included in the participation message is selected. The closest node ID is a node ID whose high order digits match those of the node ID included in the participation message the most or a node ID whose difference with a compared node ID is smallest. An explanation will be performed using an example where the selected node apparatus is the node apparatus N2. In this case, the information indicating the stage number of a table to be replied next is included in a participation message. In the above example, a level 2 is included in the participation message.

The node N35 which received the participation message transmits a reply message, which includes the node information registered in the level 2 of the routing table of the node N35, to the node N8. In addition, the node N35 transmits the participation message to the node N2 selected from the routing table. In this case, the information indicating the level 3 is included, as the stage number of a table to be replied next, in the participation message.

The node N2 which received the participation message transmits a reply message, which includes the node information registered in the level 3 of the routing table of the node N2, to the node N8. Thus, the participation message is transmitted on the basis of DHT routing using the node ID as a key. Therefore, it is transmitted to the node Nn which has a node ID closest to the node ID of the non-participating node N8.

Then, the node N8 creates a routing table using the node information included in the reply message received from each node Nn. Specifically, the node information transmitted from the contact node is registered in the level 1 of the routing table of the node N8. The node information transmitted from the node N35 is registered in the level 2 of the routing table of the node N8. The node information transmitted from the node N2 is registered in the level 3 of the routing table of the node N8.

In this way, the participation of the node N8 in the distributed storage system S is ended. In the present embodiment, various messages, such as the participation message described above and a query to be described later, include the node information on the node Nn of a message transmission source. Therefore, the node apparatus Nn which received the message registers and updates the node information in the routing table of the node apparatus Nn.

Figure 8:
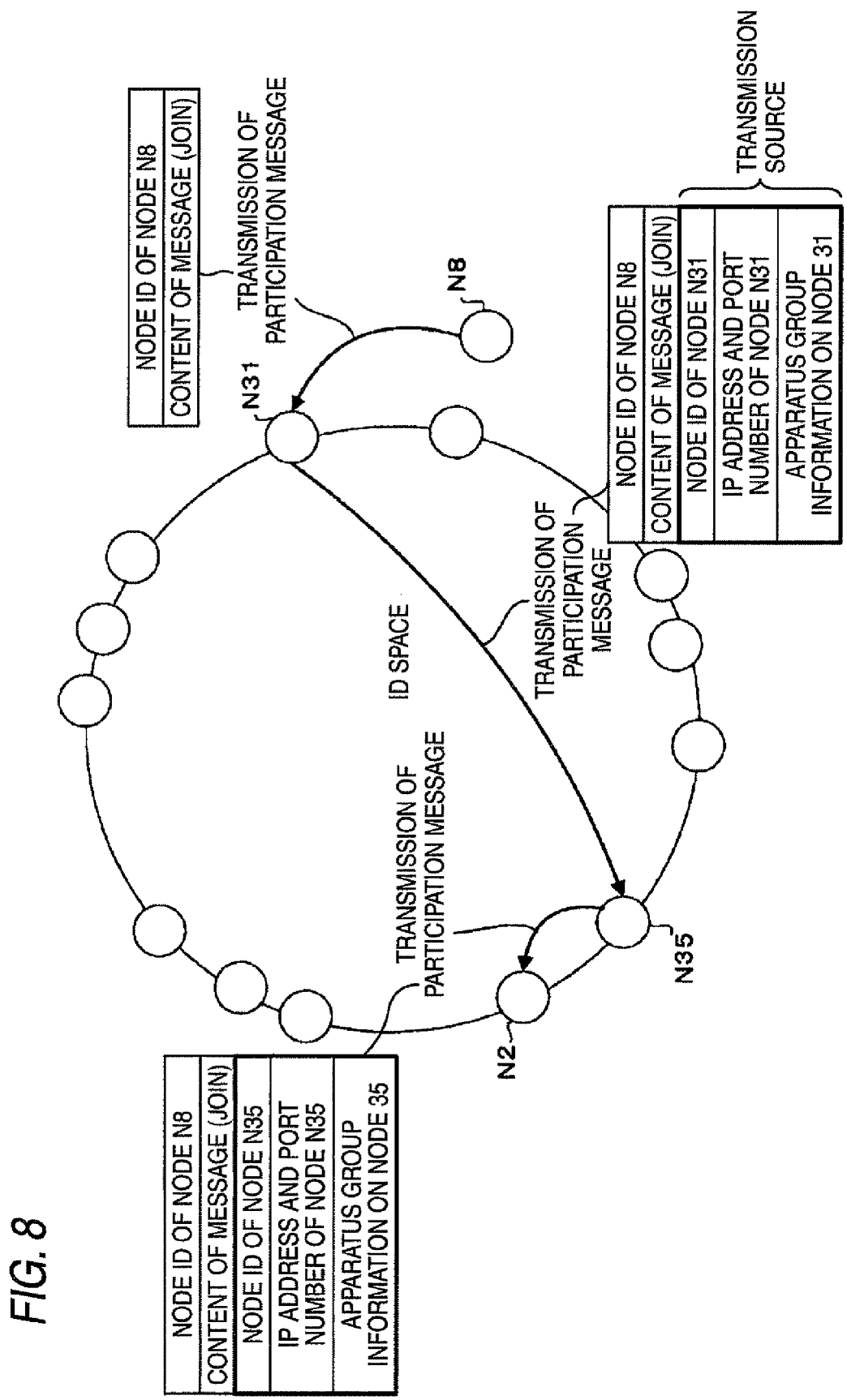
FIG. 8 is a conceptual view showing the situation of a message transmitted between the nodes Nn.

FIG. 8 is a conceptual view showing that a participation message from the node 8 is transmitted between the node N31, the node N35, and the node N2. The message transmitted between the nodes Nn includes a node ID of a message transmission source, the content of the message, and the node information on the transmission source. The node ID of the message transmission source is a node ID of the node Nn of the transmission source which transmitted the message. The content of the message is "participation (JOIN)", "publish", "query", and the like indicating the object of the message. The node information includes a node ID, an IP address or a port number, and apparatus group information of the node Nn of the transmission source. In addition, the "content of a message" includes the information, which requests the reply of the registration information of a table, in the case of a participation message. In addition, in the case of a publish (registration) message or the query, a content ID of the content data which is an object of the publish (registration) or the query (request) is included.

In the case of the example shown in FIG. 8, the node N35 receives a participation message from the node N31 of a contact node. Then, the node N35 registers in the routing table of the node N35 the node information on the node N31 of the transmission source included in the participation message. In this case, when the node information on the node N31 is already registered in the routing table of the node N35, the register node information of the node N31 is updated on the basis of the received node information.

Similarly, the node N2 which received the participation message from the node N35 registers or updates the node information on the node N35 of the transmission source, which is included in the participation message, in the routing table of the node N2. According to the procedure described above, the node information in the routing table is registered or updated. Such a routing table using a DHT is known in JP-A-2006-197400, and accordingly, the detailed explanation will be omitted. Therefore, since the apparatus group information on a node apparatus is stored in the routing table, a communication path with a small communication load can be decided on the basis of the apparatus group information stored in the routing table.

[Index Cache]

Replicas of various content data with different content in the distributed storage system S are distributed and stored in the plurality of node apparatuses Nn in a predetermined file format. The content is a film, a moving image, music, and the like. The replica can be transmitted or received between the node apparatuses Nn.

The information including a content name (title) and a content ID is given to each replica of the content data. The content name may be a title of the content data. In addition, the content ID is unique content identification information for each item of content. For example, the content ID is created by hashing "content name+arbitrary value" using a common hash function when acquiring the above node ID. Accordingly, the content ID is disposed in the same ID space as the node ID. Alternatively, the system administrator may give a unique ID value for every content data. The ID value may have the same bit length as the node ID. A content catalog list in which a content name and its content ID are described so as to match each other is distributed to all the nodes Nn. Publish start date and time and publish end date and time of a replica indicated by the content name, the content ID, and the content ID are described in the content catalog list so as to match each other. In addition, since details of the content catalog list are disclosed in JP-A-2008-129694, the detailed explanation will be omitted.

The locations of replicas which are distributed and stored as described above are managed using the index information. The index information is information obtained by combination of the information on the node apparatus Nn, which stores a replica, and a content ID of the replica. The index information is stored in the node apparatus Nn which manages the location of a replica. The node apparatus which manages the location of a replica is assumed to be a "root node". That is, the node information on the node apparatus Nn which stores a replica of content data is managed by the root node so that it can be provided according to the inquiry from other node apparatuses Nn. The node apparatus Nn which stores a replica of content is assumed to be a "hold node". The node Nn which has a node ID closest to the content ID is selected as the root node. For example, being closest to the content ID means that high order digits of a node match those of the content ID as many as possible or a difference of the comparison result is the smallest.

The node N2 shown in FIG. 9 is a root node of content 1, content 2, and content 3, . . . . The node N2 receives a publish message from the hold node Nn shown in FIG. 11. Then, the node N2 registers the content ID and the node information, which are included in the published message, in the index cache as index information. The node information includes a "node ID", "IP address and port number", and "apparatus group information" of a message transmission destination candidate. In FIG. 9, a node 21a, a node 21b, a node 21c, a node 21d, and a node 21e are described as hold nodes of content 1 in the index information. The node information corresponding to each hold node is included in the index information.

When a user of a certain node apparatus Nn wants to acquire a replica of desired content data, the user who desires to acquire the replica creates a query. The node apparatus Nn that the user wants to acquire is assumed to be a "user node". The query includes a content ID of content data and an IP address of a user node. The content ID included in the query is a content ID of the content data selected from the content catalog list by the user.

The user node transmits the query to other node apparatuses Nn according to a routing table of the user node. That is, the user node transmits the query to the root node. As a result, the query arrives at the root node using the content ID as a key.

The root node which received the query acquires the index information, which corresponds to the content ID included in the query, from the index cache storage region. The acquired index information is replied to the user node which is a transmission source of the query. The user node which acquired the index information as described above can check the IP address of the hold node from the acquired index information. On the basis of the IP address of the acquired hold node, the user node transmits a content transmission request message. Then, the user node can acquire (download) the replica of the content data from the hold node. When acquiring the replica, the content ID of the replica is acquired together with the replica.

Then, the user node stores the replica of the content data acquired from the hold node in a storage means, such as a hard disk. The user node which has stored the replica notifies the root node that the replica was stored. In order to notify that the replica was stored, the user node creates a publish message including the content ID of the replica and the node information on the user node. The created publish message is transmitted from the user node to the root node. If the publish message is transmitted, other node apparatuses Nn which participate in the distributed storage system S can also acquire (download) the replica from the user node which acquired the replica.

By the above-described method, the publish message reaches the root node by DHT routing using the content ID as a key like a query. In addition, the root node can register the index information, which includes a set of node information on the user node and the content ID of the replica included in the received publish message. As a result, the above-described user node newly becomes a hold node which holds the replica of content. In addition, the index information on the user node included in the publish message is also registered in the node apparatus Nn in a transmission path until it reaches the root node. In addition, the root node may transmit the content transmission request message to the content hold node indicated by an IP address or the like included in the location information. In this case, the content hold node accesses a user node to provide content.

In addition, all content stored in the content distributed storage system S are managed by a content managing server MS. In addition, the content managing server MS is not shown in the present embodiment. The content managing server MS stores the attribute information of all content stored in the distributed storage system S. In addition, the content managing server MS distributes the content catalog information including the attribute information of content to all the node apparatuses Nn by DHT multicast. In the DHT multicast, a message distributed from the content managing server MS to a certain node Nn is sequentially transmitted to the node apparatuses Nn, which are connected to the distributed storage system S, according to a routing table using a DHT. Eventually, the message is transmitted to all node apparatuses Nn. In addition, since the DHT multicast is known in JP-A-2007-053662, for example, a detailed explanation thereof will be omitted.

[Explanation on a Method of Deciding a Content Hold Node]

A method of deciding a hold node, from which the content is acquired, on the basis of the apparatus group information acquired when each node apparatus Nn participates in the P2P network 9 will be described. Specifically, the explanation will be performed using an example where the user node 21a shown in FIG. 3 transmits the content transmission request message of content 1 to the root node. As shown in FIG. 9, as hold nodes of the content 1, the node information on the hold nodes 22a to 22e is stored in the root node. In addition, the root node transmits the index cache to a user node as a content acquisition candidate location. The user node which received the acquisition candidate location decides the content acquisition location on the basis of the apparatus group information on the user node.

FIG. 10 is an explanatory view showing the details of apparatus group information in the index cache of the hold nodes 22a to 22e stored in the root node. As shown in FIG. 4, the apparatus group information on the user node 21a is the high order apparatus group 13a and the low order apparatus group 14a. Decision of the content acquisition location is performed according to the priority shown below.

1. When a user node and a hold node are connected with the same low order apparatus group, the content data is acquired from the hold node connected to the same low order apparatus group.

2. When a user node and a hold node are connected with the same low order apparatus group, the user node and the hold node are connected with the same high order apparatus group, and the content data is acquired from the hold node which is directly connected to the high order apparatus group.

3. When a user node and a hold node are not connected with the same low order apparatus group and the user node and the hold node are not connected with the same high order apparatus group, the content data is acquired from the hold node which is directly connected to another high order apparatus group.

In the present embodiment, the acquisition location of content data is decided on the basis of the priority described above. As a result, since the number of apparatuses through which the content passes can be reduced when acquiring the content, the communication load between apparatus groups can be reduced. For example, when the apparatus group information on the user node 21a is the "high order apparatus group 13a" and the "low order apparatus group 14a", the node apparatus 22a is a hold node which has the same low order apparatus group as the user node 21a, as shown in FIG. 10. Similarly, the node apparatus 22b is a hold node apparatus which has the same high order apparatus group as the user node 21a. The node apparatus 22c is a hold node which has the same high order apparatus group as the user node 21a and which is directly connected with the high order apparatus group. The node apparatus 22d is a hold node which does not have the same high order apparatus group as the user node 21a and which is directly connected with a high order apparatus group. The node apparatus 22e is a hold node which does not have the same low order apparatus group as the user node 21a and which does not have the same high order apparatus group as the user node 21a. Accordingly, the hold nodes are decided according to the priorities of the node apparatus 22a, the node apparatus 22c, and the node apparatus 22d. In addition, as compared with the node apparatus 22a, the node apparatus 22c, and the node apparatus 22d, the priorities of the node apparatus 22b and the node apparatus 22e are low. Of the node apparatus 22b and the node apparatus 22e, the node apparatus 22b is prioritized because the high order apparatus group of the node apparatus 22b matches the high order apparatus group of the user node 21a. Accordingly, since a node apparatus which requested content can acquire the content from a hold node with a small communication load, it is possible to reduce the communication load at the time of content acquisition.

In the present embodiment, the processing of deciding the content acquisition location is performed by the user node. If the user node transmits the apparatus group information on the user node together with a query, the root node can decide the content acquisition location. In this case, the content acquisition location decided by the root node is transmitted to the user node. In addition, a content transmission request message may be transmitted to a hold node decided as the acquisition location.

[Explanation on a Method of Updating a Routing Table]

In the present embodiment, the routing table shown in FIG. 5 is updated on the basis of the node information included in various messages received by the node apparatus Nn. When a node ID of the node information included in the received message is not registered in the routing table and there is an area where a node ID can be registered, new node information is registered. On the other hand, there is a case where a node ID of the node information included in a received message is not registered in a routing table and an area, in which a node ID can be registered, is present but other node information is already registered in the area. In this case, the apparatus group information of the node information already registered is compared with the apparatus group information of the node information included in the received message. Specifically, the node information which has the apparatus group information with a high priority with the node apparatus Nn, which received a message, as a reference is registered in the routing table. The high priority means that there are few apparatus groups through which the requested content passes.

[Electrical Configuration of a Node Apparatus]

Figure 11:
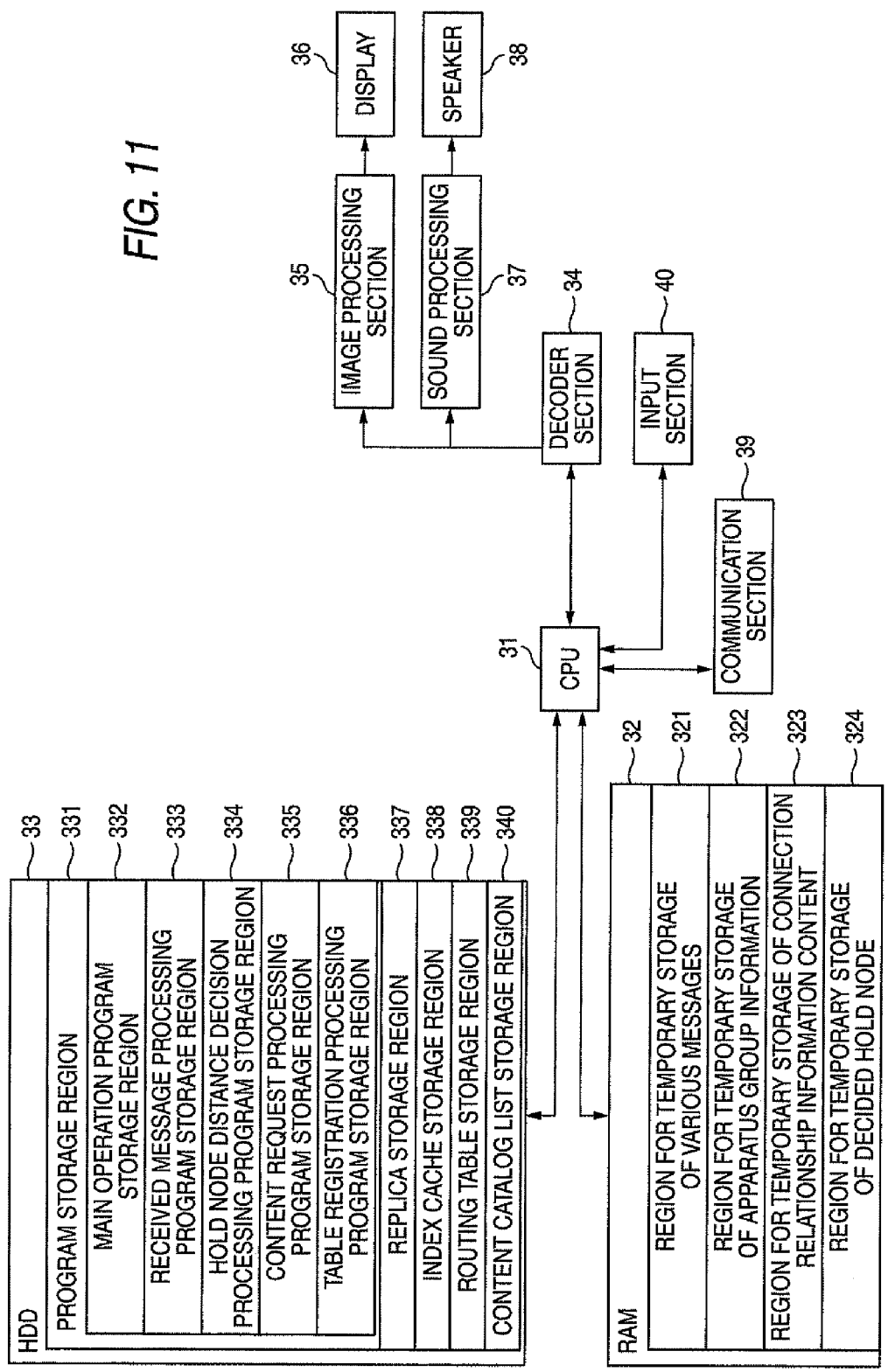
FIG. 11 is a conceptual view showing the electrical configuration of the node apparatus Nn.

Next, the electrical configuration of the node apparatus Nn will be described with reference to FIG. 11. As shown in FIG. 11, the node apparatus Nn in the present embodiment includes a CPU 31 which controls the node apparatus Nn. A RAM 32, a HDD 33, a decoder section 34, a communication section 39, and an input section 40 are electrically connected to the CPU 31. A storage means, such as the RAM 32 and the HDD 33, and the CPU 31 form a computer of the node apparatus Nn. The computer performs processing for controlling the operation of the node apparatus Nn.

The RAM 32 includes a region 321 for temporary storage of various messages, a region 322 for temporary storage of apparatus group information, a region 323 for temporary storage of connection relationship information content, and a region 324 for temporary storage of a decided hold node. The region 321 for temporary storage of various messages temporarily stores various messages received by the node apparatus Nn. For example, they are a participation message, a publish message, a query, and the like. The region 322 for temporary storage of apparatus group information temporarily stores the information on an apparatus group connected to the node apparatus Nn. The region 323 for temporary storage of connection relationship information content temporarily stores the acquired connection relationship information content. The region 324 for temporary storage of a decided hold node temporarily stores the node information of a hold node decided by hold node distance decision processing, which will be described later.

The HDD 33 includes a program storage region 331, a replica storage region 337, an index cache storage region 338, a routing table storage region 339, and a content catalog list storage region 340. The program storage region 331 includes a main operation program storage region 332, a received message processing program storage region 333, a hold node distance decision processing program storage region 334, a content request processing program storage region 335, and a table registration processing program storage region 336. The main operation program storage region 332 stores the program information for controlling the node apparatus Nn. The received message processing program storage region 333 executes predetermined processing on the basis of various messages. From hold nodes in the index cache of the root node, the hold node distance decision processing program storage region 334 decides a hold node with a small number of apparatus groups from the user node. The content request processing program storage region 335 stores the program information for content request. The table registration processing program storage region 336 stores the node information and the program information for performing registration and updating in a routing table. The replica storage region 337 stores a replica transmitted from the content input server 16 or other node apparatuses Nn. The replica storage region 337 stores the publish time and the evaluation value of a stored replica so as to match the replica. The index cache storage region 338 stores the index cache described above. The routing table storage region 339 stores the routing table described above. The content catalog list storage region 340 stores the content catalog list described above.

The decoder section 34 decodes the image information and the sound information. Decode in the present embodiment means performing data expansion of the encoded image information and sound information or decoding the encoded image information and sound information. The image information and the sound information are included in a replica of content data.

An image processing section 35 outputs an image signal by performing predetermined drawing processing on the decoded image information.

A display 36 displays an image on the basis of the image signal output from the image processing section 35. The display 36 is formed by a CRT display or a liquid crystal display.

A sound processing section 37 performs D (Digital)/A (analog) conversion of the decoded sound information into an analog audio signal.

A speaker 38 amplifies the converted analog audio signal using an amplifier and outputs it.

The communication section 39 connects the node apparatus Nn with the Internet. The communication section 39 transmits/receives the information to/from other node apparatuses Nn, the content input server 16, or the hint server 17 through the network 8.

The input section 40 receives an instruction from the user. The input section 40 is formed by a keyboard, a mouse, an operation panel, or the like. In addition, a personal computer, an STB (Set Top Box), a TV receiver, or the like may be applied as the node apparatus Nn.

Moreover, in the case where the distributed storage system S includes a contact node which is an access destination when participating in the distributed storage system S, an IP address or a port number of the contact node is stored in the HDD 33 of each node apparatus Nn. In addition, a content catalog list is stored in the HDD 33. In addition, a program stored in the HDD 33 may be downloaded from a predetermined server on the network 8, for example. In addition, the program may be recorded in a recording medium, such as a CD-ROM, and may be read through the drive of the recording medium.

[Main Processing Operation of the Node Apparatus Nn]

Figures 12, 12A, 12B:
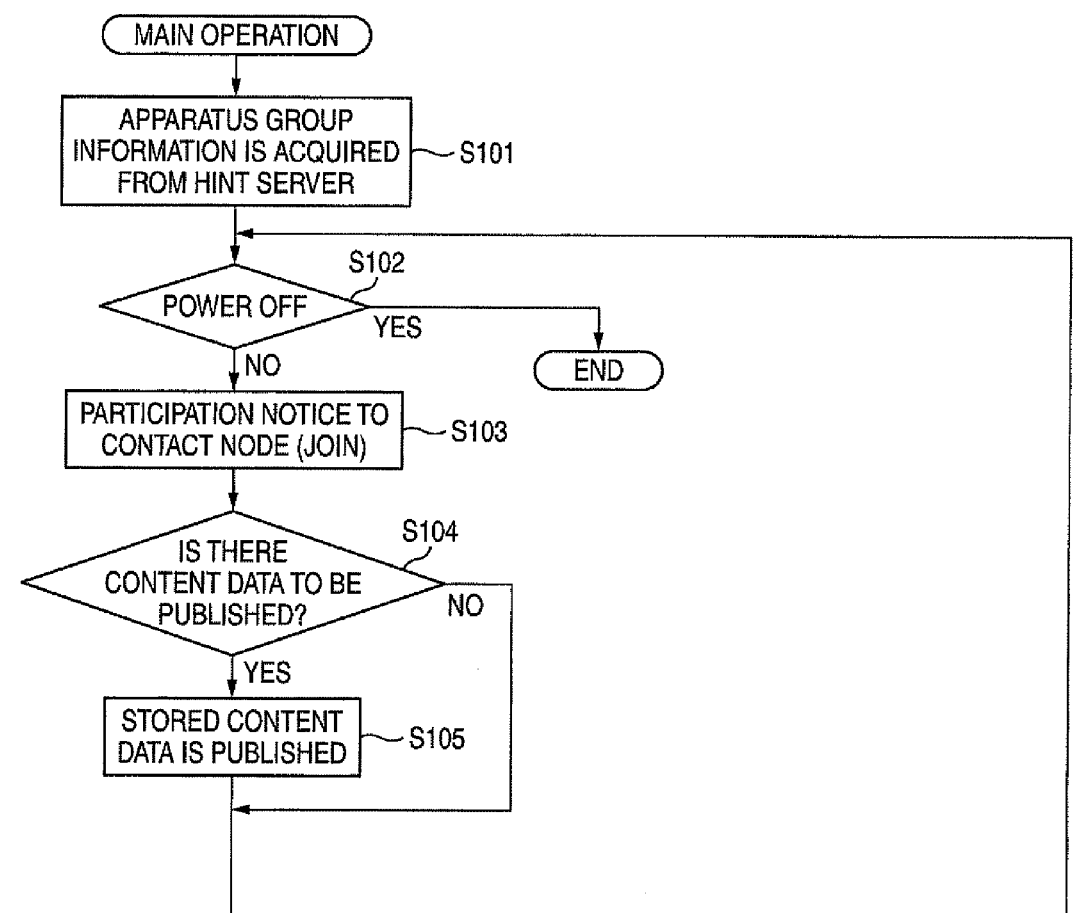
FIG. 12A and FIG. 12B are flow charts showing a main processing operation of the node apparatus Nn.
Figure 12B:
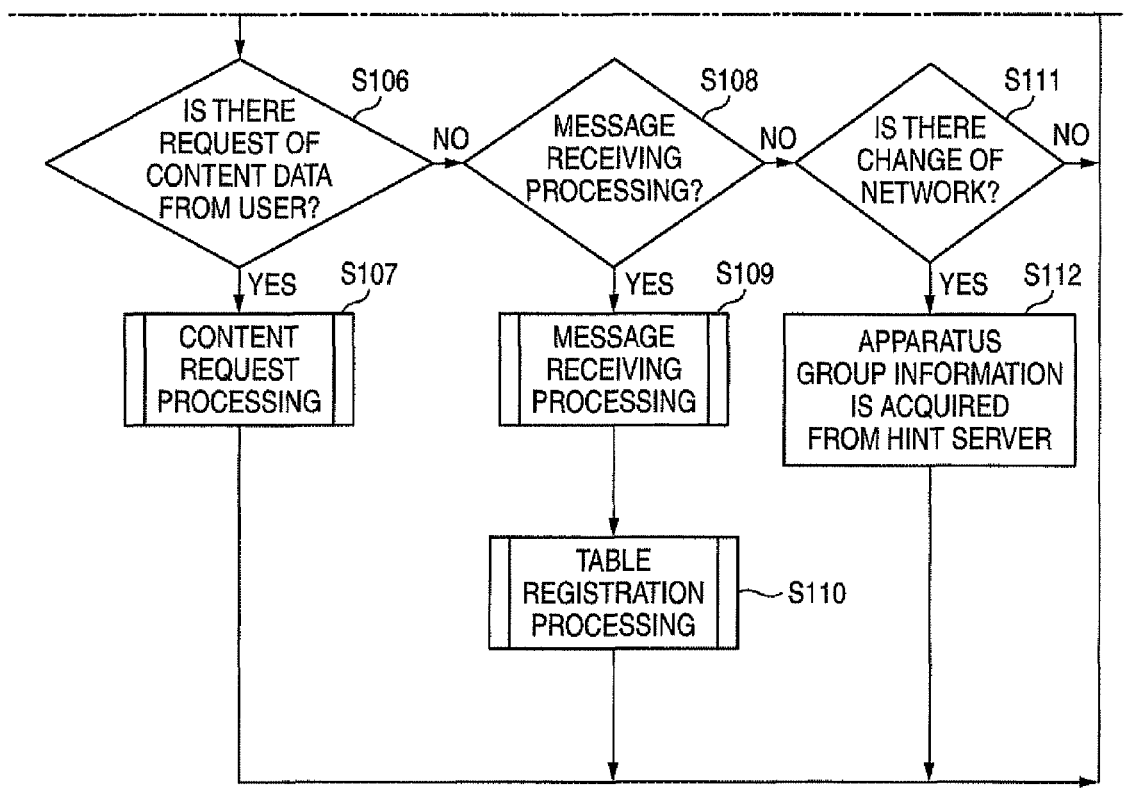

Operations and effects of the node apparatus Nn of the present embodiment configured as described above will be described with reference to the accompanying drawings. The main operation of the node apparatus Nn shown in FIG. 12 is executed when the node apparatus Nn requests processing for participating in the P2P network. The main operation is executed when the CPU 31 executes a main operation program. The processing shown below is processed by the CPU 31.

In step S101, connection to the hint server 17 is performed to acquire the apparatus group information on the node apparatus Nn itself. Specifically, a high order apparatus group or a low order apparatus group connected to the node Nn itself is decided on the basis of an IP address set for the node Nn itself. The decided high order apparatus group or low order apparatus group is acquired by the node Nn. In addition, the apparatus group information shown in FIG. 4 is acquired on the basis of the topology information shown in FIG. 3 and the IP address of the node apparatus Nn itself.

In step S102, it is determined whether or not a power source of a node apparatus Nn has been turned OFF. When it is determined that the power source of the node apparatus Nn has been turned OFF, the main processing operation of the node apparatus Nn is ended. When it is determined that the power source of the node apparatus Nn has not been turned OFF, step S103 is executed.

In step S103, a participation message (JOIN) is transmitted to a contact node. Specifically, in step S103, a participation message including the node information on the node apparatus Nn itself is transmitted. In addition, a routing table which transmits various messages and a content catalog list are acquired from the contact node.

In step S104, it is determined whether or not the content data published in the P2P network 9 is included in the replica storage region 337 of the node apparatus Nn. When it is determined that there is the published content data, step S105 is executed. When it is determined that there is no published content data, step S106 is executed.

In step S105, the content data stored in the replica storage region 337 is published in the P2P network 8. Specifically, the above-described publish message is transmitted to a root node.

In step S106, it is determined whether or not there has been a request of acquisition of the content data from the user. In step S106, it is determined whether or not predetermined content has been requested by the content catalog list that the node apparatus Nn has.

In step S107, content request processing is executed. The content that the user wants is acquired by executing the content request processing.

In step S108, it is determined whether or not various messages have been received. For example, the various messages are a participation request message, a publish message, a query, and the like. When it is determined that various messages have been received, step S109 is executed. When it is determined that various messages have not been received, step S111 is executed.

In step S109, message receiving processing is executed. Predetermined processing is executed on the basis of each message.

In step S110, table registration processing is executed on the basis of the message received in step S109. The node information included in the message received in step S108 is stored in the routing table.

In step S111, it is determined that there has been a change of a network. The network change means that there is a change in a global IP address of a connected network. When it is determined that there has been a change of a network, step S112 is executed.

In step S112, connection to the hint server 17 is performed to acquire the apparatus group information on the node apparatus Nn itself. Specifically, the apparatus group information shown in FIG. 4 is acquired on the basis of the topology information shown in FIG. 3 and the IP address of the node apparatus Nn itself.

[Message Receiving Processing]

Figure 13A:
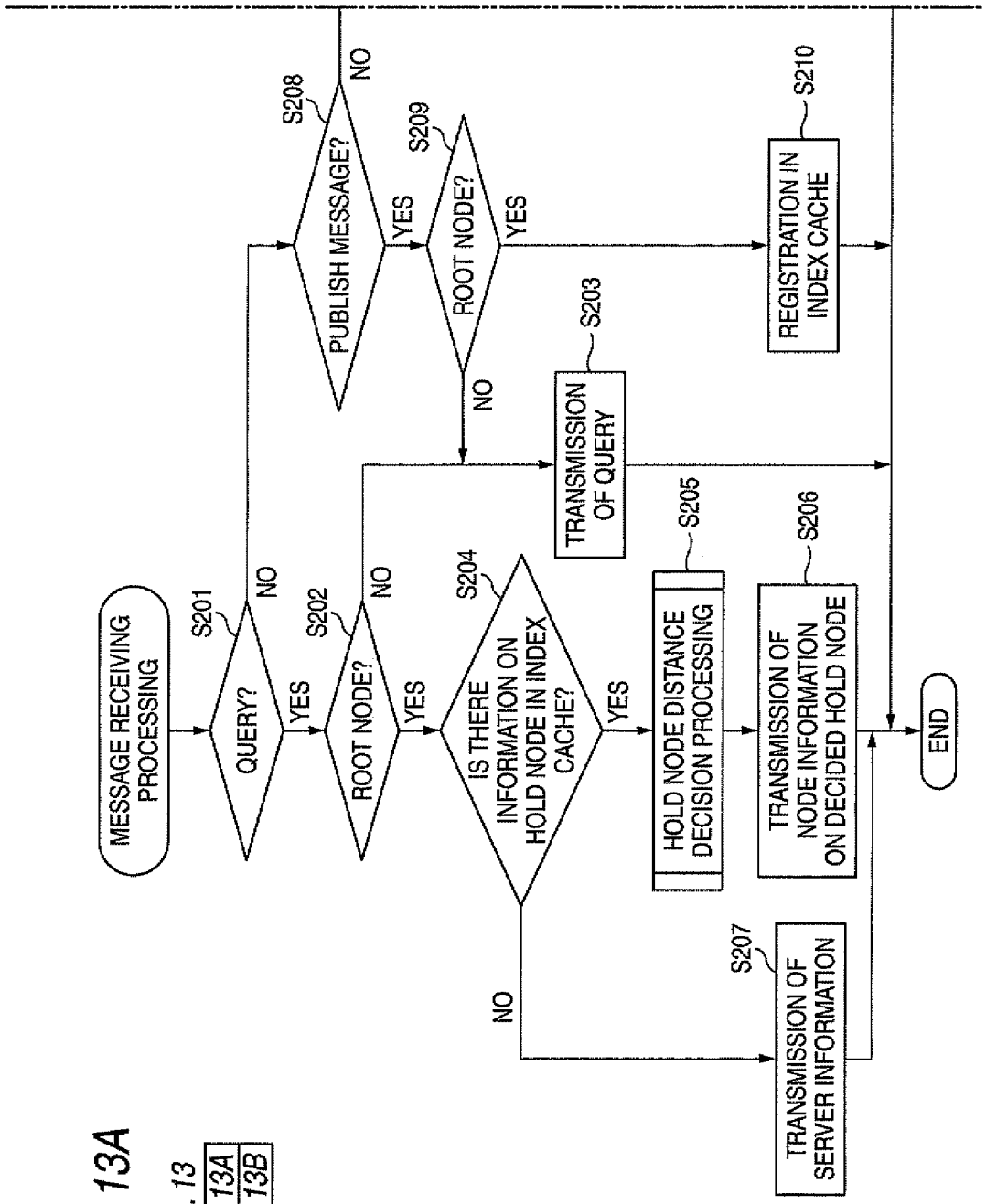
FIG. 13A and FIG. 13B are flow charts when message receiving processing of the node apparatus Nn is executed according to a message receiving processing program.
Figure 13B:
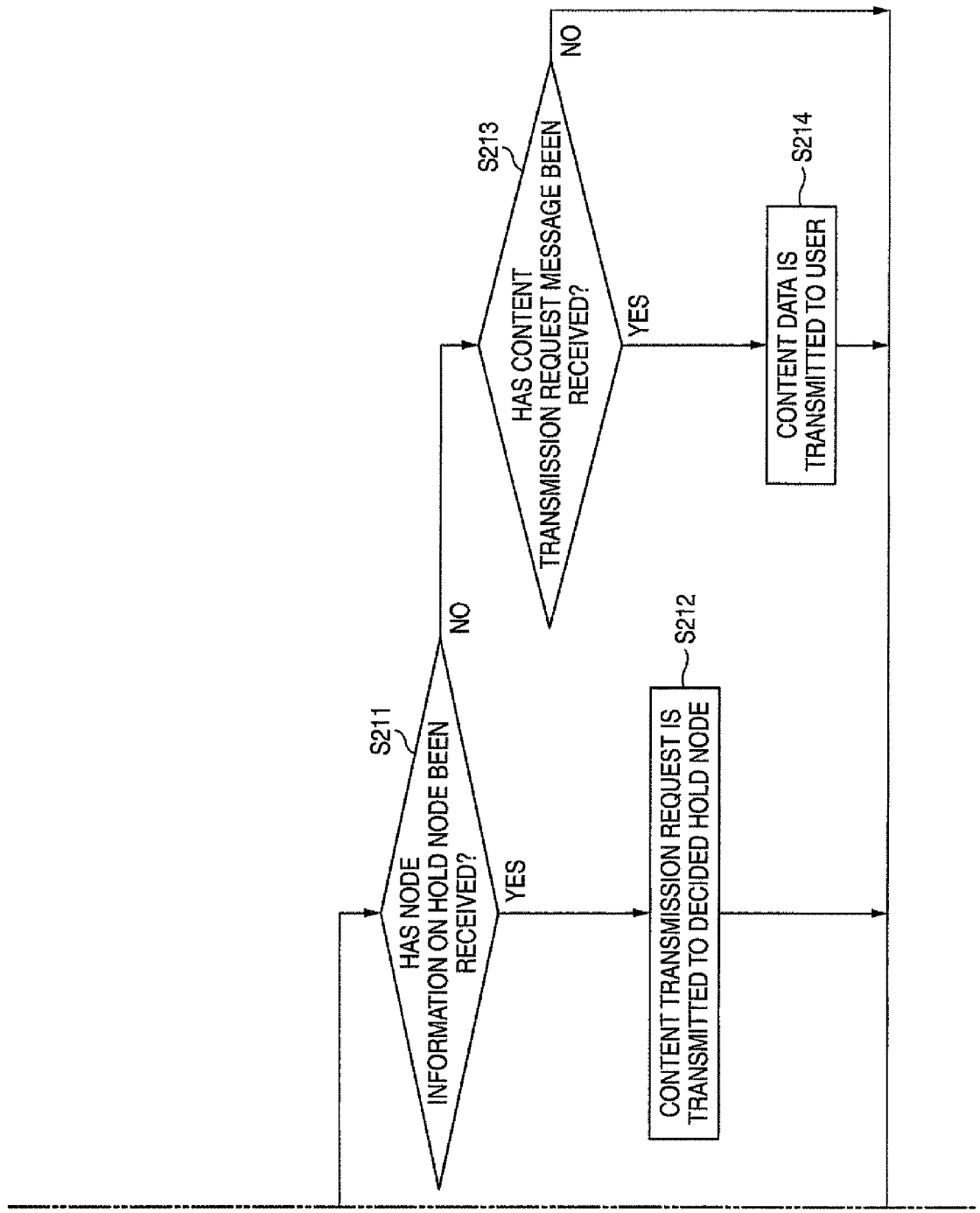

In the message receiving processing shown in FIG. 13, first, it is determined whether or not the received message is a query in step S201. Whether or not the received message is a query is determined on the basis of the message content included in a message stored in the region 321 for temporary storage of various messages. When it is determined that the received message is a query, step S202 is executed. When it is determined that the received message is not a query, step S208 is executed.

In step S202, it is determined whether or not the node apparatus Nn is a root node. When there is no message transmission destination in the routing table or when the transmission destination indicates the node apparatus Nn itself, it is determined that the node apparatus Nn is a root node. When it is determined that the node apparatus Nn is a root node, step S204 is executed. When it is determined that the node apparatus Nn is not a root node, step S203 is executed.

In step S203, a message is transmitted to other node apparatuses Nn according to the routing table.

In step S204, it is determined whether or not the information on a hold node is stored in the index cache stored in the index cache storage region 338. When it is determined that the information on a hold node is stored, step S205 is executed. When it is determined that the information on a hold node is not stored, step 5207 is executed.

In step S205, hold node distance decision processing is executed. A hold node, for which a small number of apparatus groups are passed through from the user node, is decided on the basis of the apparatus group information on hold nodes described in the index cache.

In step S206, the node information on the hold node decided in step S205 is transmitted to the message transmission source.

In step S207, since a content hold node is not present in the index cache, the information on the content managing server MS is transmitted to the message transmission source. The information on the content managing server MS is an IP address of the content managing server MS, for example. Each node apparatus Nn knows the information on the content managing server MS beforehand, it is stored beforehand in the HDD 33.

In step S208, it is determined whether or not the received message is a publish message. Whether or not the received message is a publish message is determined on the basis of the message content included in a message stored in the region 321 for temporary storage of various messages. When it is determined that the received message is a publish message, step S209 is executed. When it is determined that the received message is not a publish message, step S211 is executed.

In step S209, it is determined whether or not the node apparatus Nn is a root node. When there is no message transmission destination in the routing table or when the transmission destination indicates the node apparatus Nn itself, it is determined that the node apparatus Nn is a root node. When it is determined that the node apparatus Nn is a root node, step S210 is executed. When it is determined that the node apparatus Nn is not a root node, step S203 is executed.

In step S210, the content of the publish message is registered in the index cache stored in the index cache storage region 338.

In step S211, it is determined whether or not the node information on the hold node has been received. The transmitted node information on the hold node is transmitted by the root node. When it is determined that the node information on the hold node has been received, step S212 is executed. When the index cache has not been received, step S213 is executed.

In step S212, the hold node content transmission request message received in step S211 is transmitted.

In step S213, it is determined whether or not the content transmission request message has been received. Whether or not the received message is a content transmission request message is determined on the basis of the message content included in a message stored in the region 321 for temporary storage of various messages. When it is determined that the received message is a content transmission request message, step S214 is executed. When it is determined that the received message is not a content transmission request message, message receiving processing is ended.

In step S214, the content data corresponding to the content transmission request message is transmitted to the user node. The transmitted content data is content data corresponding to the content ID included in the content transmission request message.

[Hold Node Distance Decision Processing]

Figure 14B:
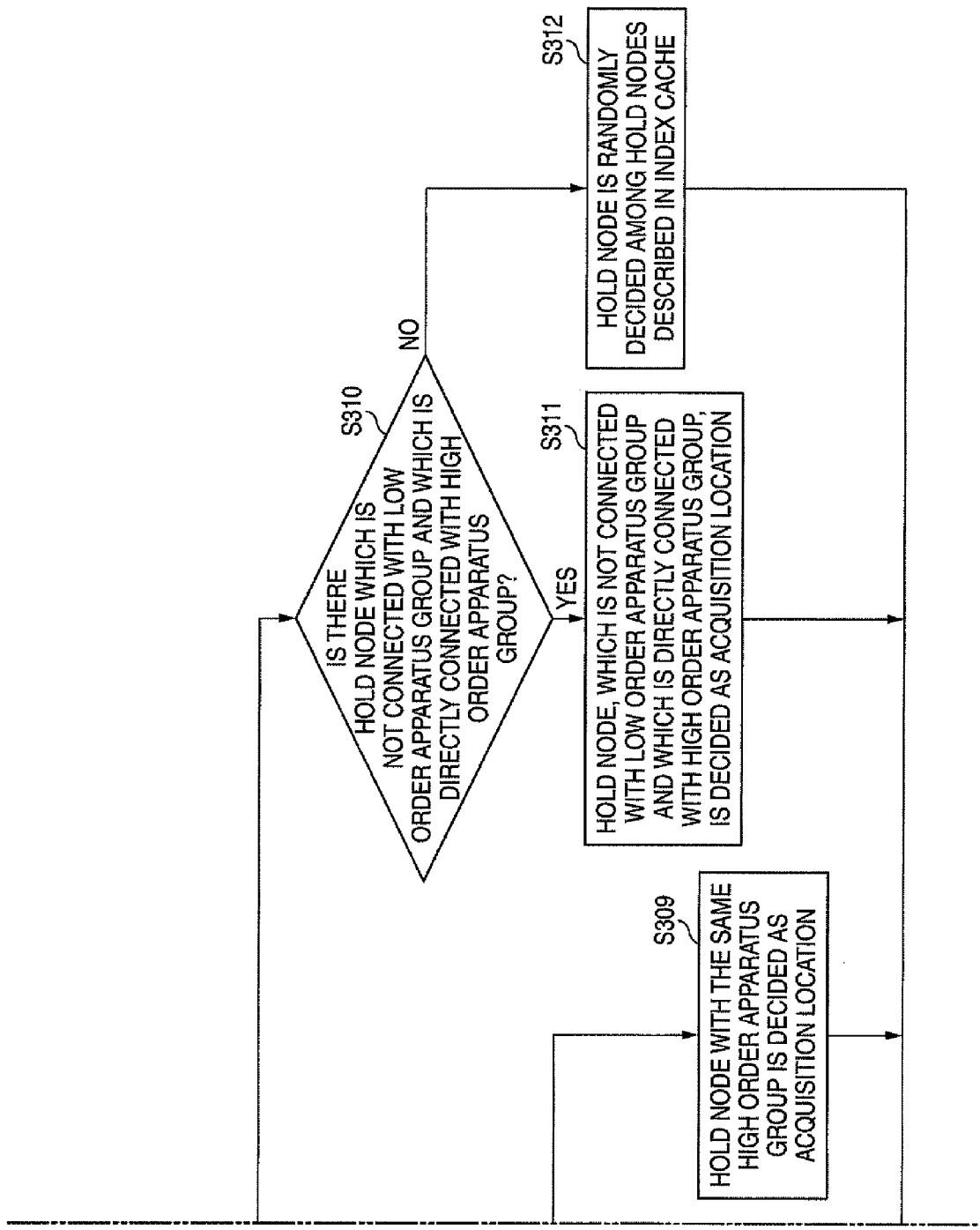

In the hold node distance decision processing shown in FIG. 14, first, it is determined whether or not the node apparatus Nn is connected to a low order apparatus group on the basis of the apparatus group information on the node apparatus Nn in step S301. When it is determined that the node apparatus Nn is connected to a low order apparatus group, step S302 is executed. When it is determined that the node apparatus Nn is not connected to a low order apparatus group, step S304 is executed. When "Null" is stored in the low order apparatus group shown in FIG. 4, it is determined that the node apparatus Nn is not connected to a low order apparatus group.

In step S302, it is determined whether or not there is a hold node which matches the low order apparatus group connected with the node apparatus Nn. Specifically, the apparatus group information on the node apparatus Nn is compared with the apparatus group information described in the index cache. The index cache to be compared is stored in the index cache storage region 338. When it is determined that there is a hold node which matches the low order apparatus group as a result of the comparison, step S303 is executed. When it is determined that there is no hold node which matches the low order apparatus group, step S304 is executed. In the present embodiment, it is determined whether or not the low order apparatus group to which the node apparatus Nn is connected matches the low order apparatus group to which the hold node is connected. On the basis of the IP address of the node apparatus Nn, it may be determined whether or not there is a hold node connected with a low order apparatus group including the IP address of the node apparatus Nn.

In step S303, the hold node determined in step S302 is decided as a hold node of an acquisition location. The decided node information of the hold node information is stored in the region 324 for temporary storage of a decided hold node. As a result, since the content can be acquired from the storage location connected to the same low order apparatus group, the number of apparatus groups through which the content passes can be reduced to the minimum.

In step S304, it is determined whether or not a high order apparatus group in the apparatus group information on the node apparatus Nn matches a high order apparatus group of the hold node. Specifically, the apparatus group information on the node apparatus Nn is compared with the apparatus group information described in the index cache. The index cache to be compared is stored in the index cache storage region 338. When it is determined that there is a hold node which matches the high order apparatus group as a result of the comparison, step S305 is executed. When it is determined that there is no hold node which matches the high order apparatus group, step S310 is executed.

In step S305, it is determined whether or not the hold node determined to match the high order apparatus group in step S304 is a node apparatus which is directly connected with the high order apparatus group. Specifically, it is determined whether or not the low order apparatus group of the hold node apparatus determined in step S305 is "Null". When it is determined that there is a hold node apparatus which is directly connected with the high order apparatus group, step S306 is executed. When it is determined that there is no hold node apparatus which is directly connected with the high order apparatus group, step S307 is executed.

In step S306, the hold node apparatus determined in step S305 which is directly connected with the high order apparatus group is decided as a content acquisition location. The decided node information of the hold node information is stored in the region 324 for temporary storage of a decided hold node. As a result, since the content can be acquired from the storage location connected to the same high order apparatus group, the number of apparatus groups through which the content passes can be reduced in communication apparatuses which form the high order apparatus group.

In step S307, it is determined whether or not there is a hold node, which is directly connected with the high order apparatus group, among hold nodes described in the index cache stored in the index cache storage region 338. When it is determined that there is a hold node which is directly connected with the high order apparatus group, step S308 is executed. When it is determined that there is no hold node which is directly connected with the high order apparatus group, step S309 is executed.

In step S308, the hold node apparatus determined in step S307 which is directly connected with the high order apparatus group is decided as a content acquisition location. The decided node information of the determined hold node information is stored in the region 324 for temporary storage of a decided hold node. If there are two or more acquisition locations, one of the hold node apparatuses is decided as an acquisition location.

In step S309, the acquisition location is randomly decided among user nodes having the same high order apparatus group as the hold node.

In step S310, similar to step S307, it is determined whether or not there is a hold node, which is directly connected with the high order apparatus group, among hold nodes described in the index cache stored in the index cache storage region 338. When it is determined that there is a hold node which is directly connected with the high order apparatus group, step S311 is executed. When it is determined that there is no hold node which is directly connected with the high order apparatus group, step S312 is executed.

In step S311, similar to step S308, the hold node apparatus determined in step S310 which is directly connected with the high order apparatus group is decided as a content acquisition location. The decided node information of the determined hold node information is stored in the region 324 for temporary storage of a decided hold node. If there are two or more acquisition locations, one of the hold node apparatuses is decided as an acquisition location. As a result, since the content can be acquired from the storage location directly connected with the high order apparatus group, it is not necessary to pass through a low order apparatus group which is located below the high order apparatus group in the order level. Therefore, the number of apparatus groups through which the content passes can be reduced.

In step S312, the acquisition location is randomly decided among hold nodes described in the index cache.

[Contents Request Processing]

Figure 15:
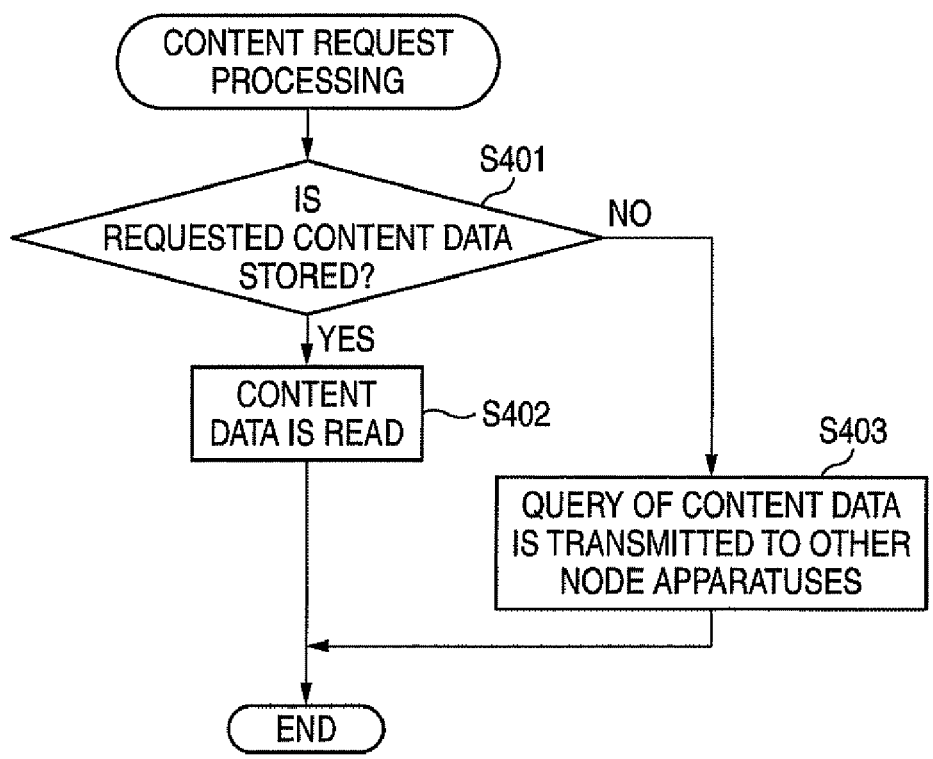
FIG. 15 is a flow chart when content request processing of the node apparatus Nn is executed according to a content request processing program.

In the content request processing shown in FIG. 15, first, it is determined whether or not the content requested by the user is stored in the replica storage region 337 in step S401. When it is determined that the content requested by the user is stored, step S402 is executed. When it is determined that the content requested by the user is not stored, step S403 is executed.

In step S402, the content requested by the user is read from the replica storage region 337.

In step S403, a query is transmitted to other node apparatuses Nn.

[Table Registration Processing]

Figure 16:
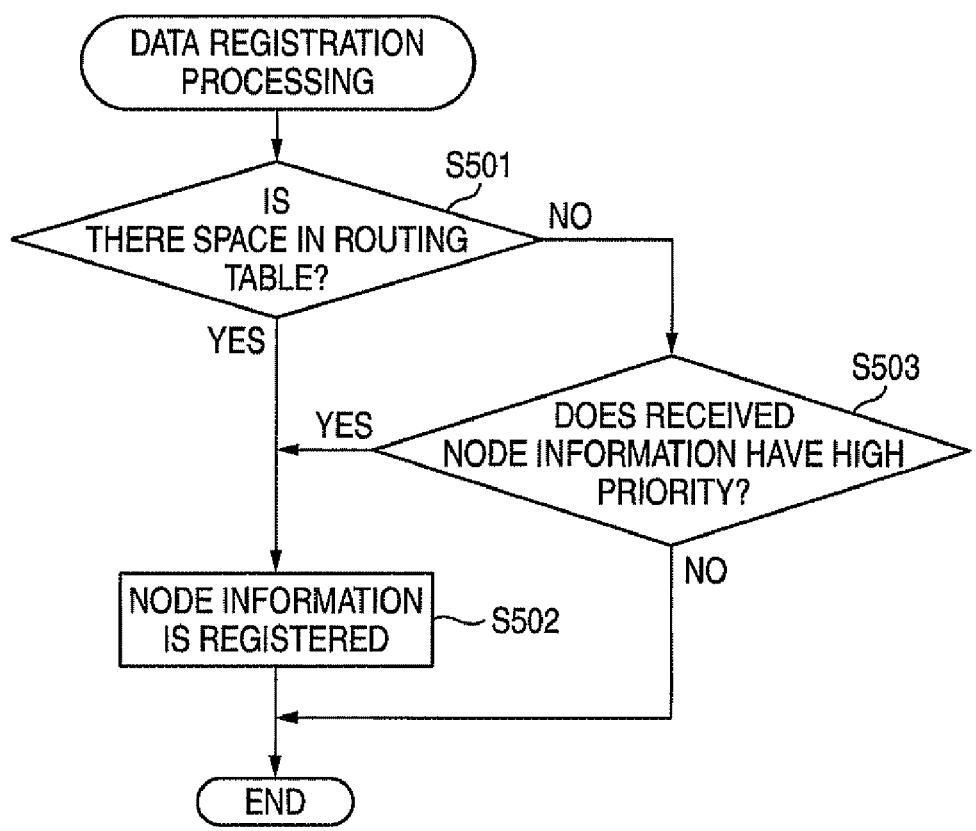
FIG. 16 is a flow chart when table registration processing of the node apparatus Nn is executed according to a table registration processing program.

In table registration processing shown in FIG. 16, first, it is determined whether or not there is a space in a routing table of the node apparatus Nn itself in step S501. When it is determined that there is a space, step S502 is executed. When it is determined that there is no space, step S503 is executed.

In step S502, the node information received in step S109 is registered in the routing table.

In step S503, the apparatus group information of the node information described in the routing table is compared with the apparatus group information of the node information received in step S109 on the basis of the apparatus group information stored in the region 322 for temporary storage of apparatus group information. As a result of the comparison, if it is determined that the apparatus group information of the node information received in step S109 is higher in the priority of deciding the acquisition location of the content, step S502 is executed. When it is determined that the apparatus group information of the node information received in step S109 is not higher in the priority of deciding the acquisition location of the content, the table registration processing is ended.

In the above embodiment, the explanation has been performed on the assumption that the content distributed storage system S is formed by the algorithm using a DHT. However, the invention is not limited to this. The invention may also be applied to those other than the routing table using the DHT. The apparatus group information on each node apparatus may also be transmitted to all node apparatuses Nn included in the P2P network 9.

In the present embodiment, the hold node is decided on the basis of the priority described in step S205 or S212. As another example, a plurality of hold nodes described in the index cache may be prioritized on the basis of the priority described above. In this case, the node information on the prioritized hold node is transmitted to the message transmission source.

Moreover, in the present embodiment, a hold node from which the content data is acquired is decided according to whether or not the high order apparatus groups or the low order apparatus groups match each other. A hold node may also be decided according to whether or not an IP address of the hold node is included in the IP address range of a high order apparatus group or a low order apparatus group.

Figures 17, 17A:
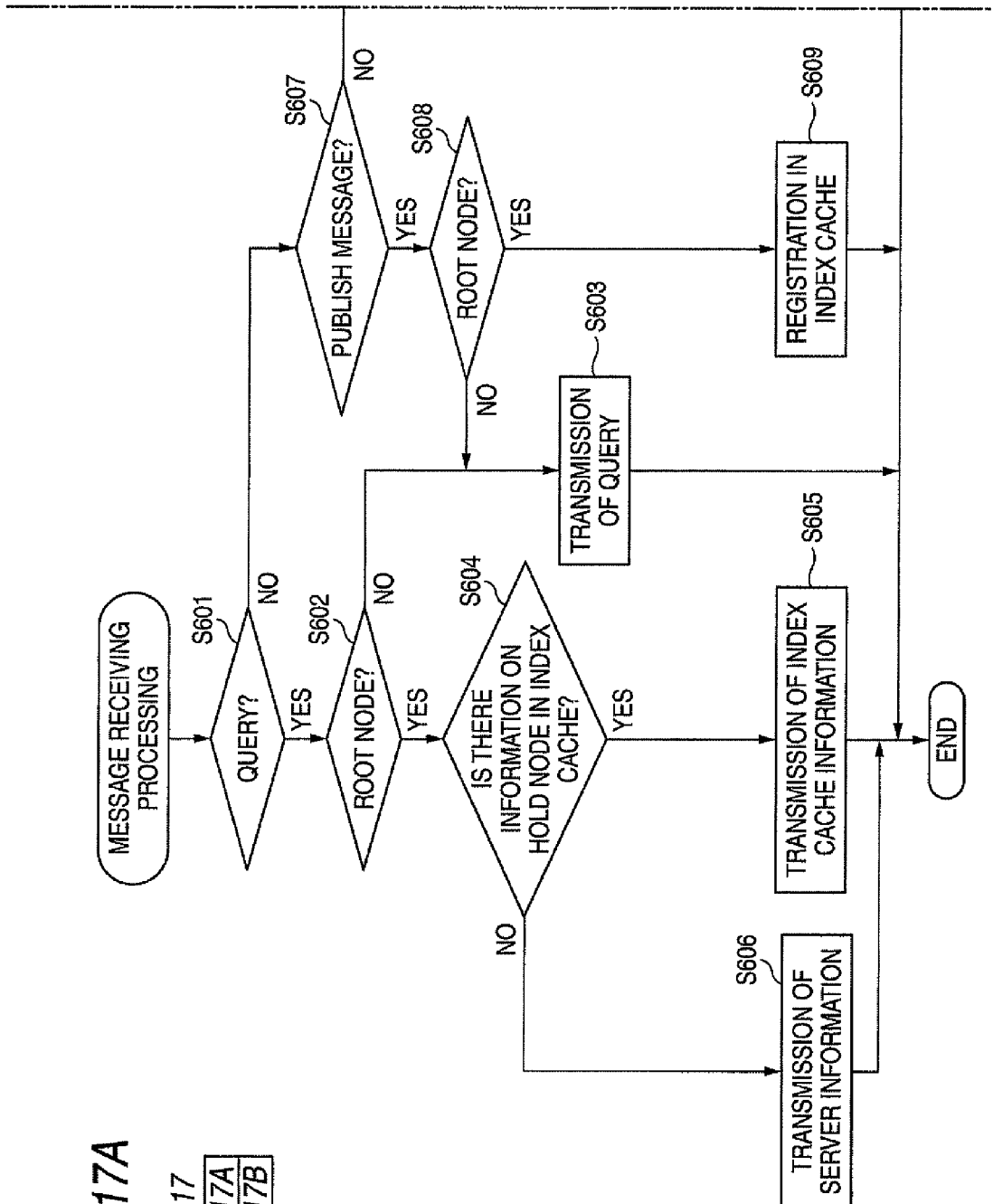
FIG. 17A and FIG. 17B are flow charts when message receiving processing of the node apparatus Nn is executed according to a message receiving processing program in a modification of the present embodiment.
Figure 17B:
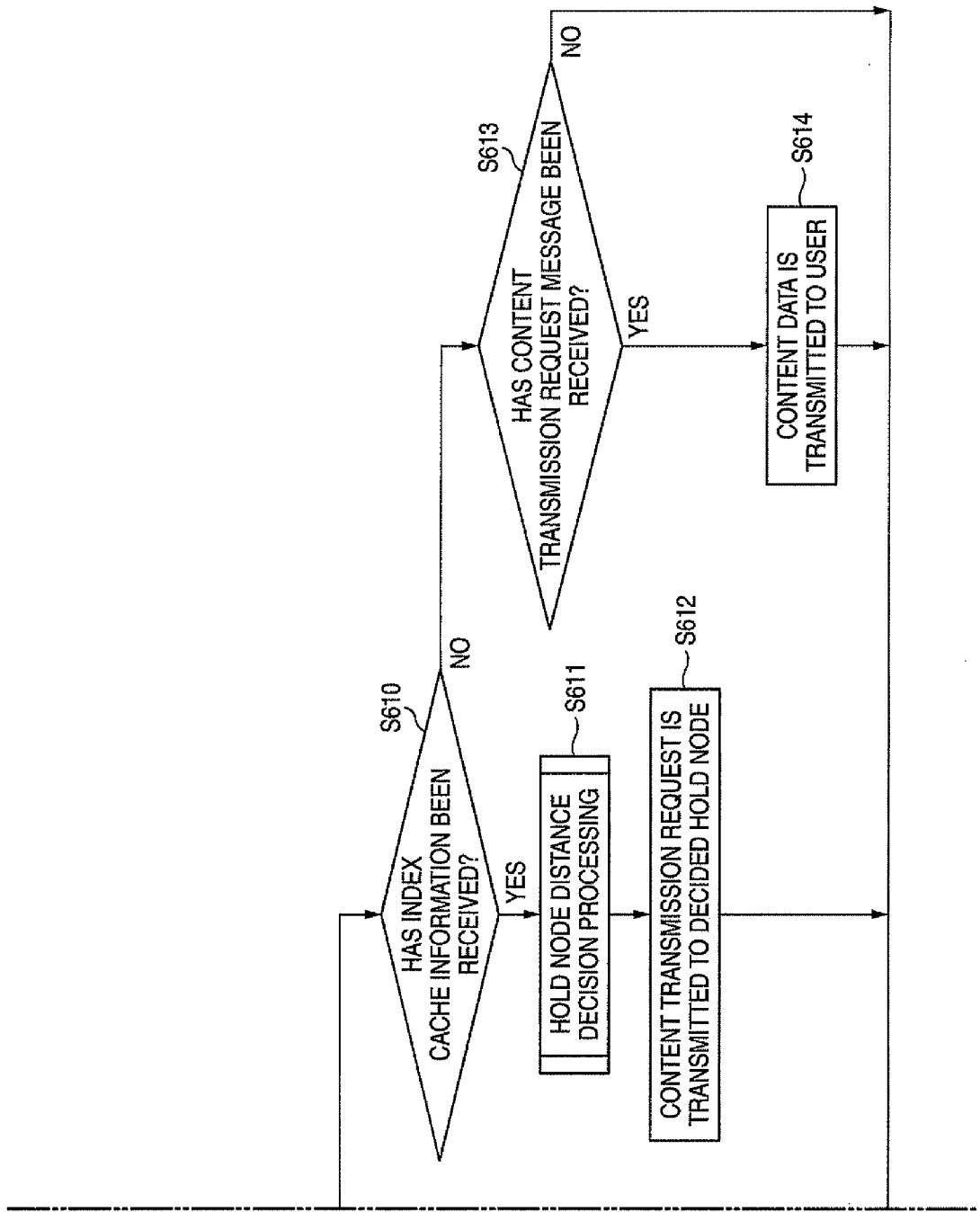

Steps S601 to 5604 in message receiving processing shown in FIG. 17 are the same as the processing in steps S201 to 5204 shown in FIG. 13. Accordingly, the explanation will be omitted. In step S605, the index information stored in the index cache storage region 338 is transmitted to the message transmission section.

The steps S606 to 5609 shown in FIG. 17 are the same as the processing in steps S207 to 8210 shown in FIG. 13, the explanation will be omitted. In step S610, it is determined whether or not the index cache information has been received. When it is determined that the index cache information has been received, step S611 is executed. When it is determined that the index cache information has not been received, step S613 is executed.

In step S611, the hold node distance decision processing is executed on the basis of the index cache information received in step S610. On the basis of the apparatus group information on hold nodes described in the index cache information received in step S610, a hold node with a small number of apparatus groups from the user node is decided.

In step S612, a content transmission request message is transmitted to the hold node decided in step S611. Steps S613 to S614 are the same as the processing in steps S213 to S214 shown in FIG. 13, the explanation will be omitted.

In the above described exemplary embodiment, one example of the higher order apparatus group or the lower order apparatus group is an ISP (Internet Service Provider). Each ISP in the internet of the real world is connected each other based on the relationship of the higher order layer and the lower order layer. The higher order apparatus group according to the exemplary embodiment is an ISP that is positioned above the ISP that is positioned below. And, the lower order apparatus group according to the exemplary embodiment is an TSP that is positioned below the ISP that is positioned above.

What is claimed is:

1. A distributed storage system that includes: a plurality of node apparatuses connected to a plurality of different networks through a high order apparatus group or a low order apparatus group, the high order apparatus group including at least one communication apparatus which connects between the networks and is assigned a predetermined IP address designated for the high order apparatus group, the low order apparatus group including at least one communication apparatus which is located below the high order apparatus group in the order level and is assigned a predetermined IP address designated for the low order apparatus group, and is connectable to the plurality of different networks through the high order apparatus group, and the distributed storage system storing a plurality of contents so as to be distributed in the plurality of node apparatuses, the distributed storage system comprising:

a first node apparatus that includes:
    a first storage unit which stores connection relationship information on the high order apparatus group and the low order apparatus group connected through the network; and
a second node apparatus that includes:
    an acquisition unit which acquires first connection information, which indicates the high order apparatus group or the low order apparatus group that is a connection destination of the node apparatus, from the first node apparatus based on location information indicating locations of the plurality of node apparatuses and the connection relationship information stored in the first storage unit; and
    a transmission unit which transmits the first connection information acquired by the acquisition unit to any of the plurality of node apparatuses included in the distributed storage system.

2. The distributed storage system according to claim 1, further comprising:
    a content hold node; and a third node apparatus that includes:
    a second storage unit that stores second connection information indicating the high order apparatus group or the low order apparatus group, to which at least one content hold node that holds content requested from the plurality of node apparatuses is connected, and location information indicating the location of the content hold node; and
    a receiving unit that receives the first connection information transmitted by the transmission unit, wherein
the second node apparatus includes:
    a content request unit that requests desired content; and
    a content acquisition unit that acquires the content requested by the content request unit;
the second or third node apparatus includes a decision unit that decides a content hold node having the second connection information with a small communication load, based on the first connection information of the second node apparatus, from the content hold nodes stored in the second storage unit; and
the content acquisition unit acquires the content from the content hold node decided by the decision unit.

3. The distributed storage system according to claim 2, wherein the content hold node includes:
    a second connection information acquisition unit that acquires the second connection information of the content hold node from the first node apparatus based on the location information of the content hold node and the connection relationship information stored in the first storage unit; and
    a second transmission unit that, when the content hold node stores predetermined content, transmits to the third node apparatus the second connection information of the content hold node together with a publish message indicating that the content hold node stores the content, wherein
        the receiving unit of the third node apparatus receives the second connection information transmitted by the second transmission unit, and
        the second storage unit stores the second connection information transmitted by the second transmission unit.

4. The distributed storage system according to claim 1, wherein each of the plurality of node apparatuses includes:
    a table storage unit that stores a routing table including the location information on a node apparatus which is able to transmit a message including content of processing a predetermined request;
    a message transmission unit that transmits a message of processing the predetermined request and transmits the location information on the node apparatus having transmitted the message and the first or second connection information on the node apparatus having transmitted the message according to the location information described in the routing table;
    a message receiving unit that receives the message transmitted by the message transmission unit; and
    a storage control unit that stores the first or second connection information in the table storage section so as to match the location information on the node apparatus when the message receiving unit receives a message.

5. The distributed storage system according to claim 4, further comprising:
    a table determination unit that determines whether or not the location information received by the message receiving unit can be stored in the routing table storage unit; and
    a node apparatus decision unit that decides a node apparatus with a small communication load from a node apparatus, which corresponds to the first or second connection information received by the message receiving unit, and a node apparatus, which corresponds to the first or second connection information already stored in the routing table, based on the first connection information on the node apparatus including the table storage unit when the table determination unit determines that the location information received by the message receiving unit can be stored in the routing table storage unit, wherein
    the routing table, which is stored in the table storage unit, stores the location information on some of the plurality of node apparatuses and the first or second connection information corresponding to the location information, and
    the storage control unit stores the location information on the node apparatus decided by the node apparatus decision unit and the first or second connection information corresponding to the location information preferentially in the routing table.

6. The distributed storage system according to claim 4, wherein
    the message transmission unit transmits a participation message for participating in the distributed storage system while transmitting the location information on a node apparatus having transmitted the message and the first or second connection information on a node apparatus of a transmission destination of the participation message,
    the message receiving unit receives the participation message transmitted by the message transmission unit, and
    when the message receiving unit receives the participation message, the storage control unit stores the first or second connection information in the table storage unit so as to match the location information on the node apparatus.

7. The distributed storage system according to claim 1, wherein
    the decision unit includes a first determination unit that determines whether or not there is a content hold node, which has the low order apparatus group that matches the low order apparatus group of the first connection information in the second node apparatus, among the content hold nodes stored in the second storage unit of the third node apparatus, and
    when the first determination unit determines that there is a content hold node matched, the content acquisition unit acquires the content from the content hold node determined to be matched by the first determination unit.

8. The distributed storage system according to claim 7, wherein
    the decision unit includes a second determination unit that determines whether or not there is a content hold node, which matches the high order apparatus group of the first connection information in the second node apparatus, when the first determination unit determines that there is no content hold node determined to be matched, and
    when the second determination unit determines that there is a content hold node matched, the content acquisition unit acquires the content from the content hold node determined to be matched by the second determination unit.

9. The distributed storage system according to claim 7, wherein the decision unit includes a third determination unit that
determines whether or not there is a content hold node,
which is directly connected with the high order apparatus group, among a plurality of storage places stored in
the second storage unit of the third node apparatus when
the first determination unit determines that there is no
content hold node determined to be matched, and
when the third determination unit determines that there is a
content hold node which is directly connected with the
high order apparatus group, the content acquisition unit
acquires the content from the content hold node determined by the third determination unit.

10. A connection information notifying method of a distributed storage system, the distributed storage system including a plurality of node apparatuses connected to a plurality of different networks through a high order apparatus group or a low order apparatus group, the high order apparatus group including at least one communication apparatus which connects between the networks and is assigned a predetermined IP address designated for the high order apparatus group, the low order apparatus group including at least one communication apparatus which is located below the high order apparatus group in the order level and is assigned a predetermined IP address designated for the low order apparatus group, and is connectable to the plurality of different networks through the high order apparatus group, the connection information notifying method comprising:
acquiring first connection information indicating a high order apparatus group or a low order apparatus group, which is a connection destination of a node apparatus, from a first node apparatus, which includes a first storage unit that stores connection relationship information on a plurality of high order apparatus groups and a plurality of low order apparatus groups connected through networks, based on location information indicating locations of a plurality of node apparatuses in the distributed storage system that stores a plurality of contents so as to be distributed in the plurality of the node apparatuses and the connection relationship information stored in the first storage unit; and
transmitting the first connection information acquired in a step of the acquiring to any of the plurality of node apparatuses included in the distributed storage system.

11. A non-transitory computer readable recording medium which records a program causing a computer to perform: an acquisition via an acquisition unit and a transmission via a transmission unit in a distributed storage system that includes a plurality of node apparatuses connected to a plurality of different networks through a high order apparatus group or a low order apparatus group, the high order apparatus group including at least one communication apparatus which connects between the networks and is assigned a predetermined IP address designated for the high order apparatus group, the low order apparatus group including at least one communication apparatus which is located below the high order apparatus group in the order level and is assigned a predetermined IP address designated for the low order apparatus group, and is connectable to the plurality of different networks through the high order apparatus group, wherein
the acquisition unit acquires first connection information indicating a high order apparatus group or a low order apparatus group, which is a connection destination of a node apparatus, from a first node apparatus, which includes a first storage unit that stores connection relationship information on a plurality of high order apparatus groups and a plurality of low order apparatus groups connected through networks, based on location information indicating locations of a plurality of node apparatuses in the distributed storage system that stores a plurality of contents so as to be distributed in the plurality of the node apparatuses and the connection relationship information stored in the first storage unit; and
the transmission unit transmits the first connection information acquired by the acquisition unit to any of the plurality of node apparatuses included in the distributed storage system.

12. The distributed storage system according to claim 1, wherein the at least one communication apparatus of the high order apparatus group is a router and the at least one communication apparatus of the low order apparatus group is a router.

13. The connection information notifying method according to claim 10, wherein the at least one communication apparatus of the high order apparatus group is a router and the at least one communication apparatus of the low order apparatus group is a router.

14. The non-transitory computer readable recording medium according to claim 11, wherein the at least one communication apparatus of the high order apparatus group is a router and the at least one communication apparatus of the low order apparatus group is a router.

* * * * *